United States Patent [19]
Tubel et al.

[11] Patent Number: 5,959,547
[45] Date of Patent: *Sep. 28, 1999

[54] WELL CONTROL SYSTEMS EMPLOYING DOWNHOLE NETWORK

[75] Inventors: Paulo Tubel, The Woodlands; Michael Wayne Holcombe, Katy, both of Tex.

[73] Assignee: Baker Hughes Incorporated, Houston, Tex.

[*] Notice: This patent is subject to a terminal disclaimer.

[21] Appl. No.: 08/932,009

[22] Filed: Sep. 17, 1997

Related U.S. Application Data

[63] Continuation-in-part of application No. 08/856,656, May 15, 1997, which is a continuation-in-part of application No. 08/695,450, Aug. 12, 1996, Pat. No. 5,662,165, which is a division of application No. 08/526,827, Sep. 11, 1995, Pat. No. 5,730,219, which is a continuation-in-part of application No. 08/386,480, Feb. 9, 1995, Pat. No. 5,597,042

[60] Provisional application No. 60/028,846, Sep. 23, 1996.

[51] Int. Cl.$^6$ .................................................. E21B 43/00
[52] U.S. Cl. ...................... 340/853.2; 166/372; 166/374; 166/205.01
[58] Field of Search ...................... 340/853.2; 166/372, 166/374, 205.01; 370/60, 229, 85.3

[56] References Cited

U.S. PATENT DOCUMENTS

| | | | |
|---|---|---|---|
| 4,633,954 | 1/1987 | Dixon et al. | 166/372 |
| 4,757,314 | 7/1988 | Aubin et al. | 340/853.2 |
| 5,132,904 | 7/1992 | Lamp | 364/528.17 |
| 5,273,112 | 12/1993 | Schultz | 166/374 |
| 5,455,828 | 10/1995 | Zisapel | 370/85.3 |
| 5,526,355 | 6/1996 | Yang et al. | 370/85.3 |
| 5,568,476 | 10/1996 | Sherer | 370/60 |
| 5,597,042 | 1/1997 | Tubel et al. | 166/250.01 |
| 5,625,825 | 4/1997 | Rostoker et al. | 395/730 |
| 5,717,889 | 2/1998 | Rettig | 370/447 |
| 5,726,976 | 3/1998 | Thompson | 370/229 |
| B1 4,915,168 | 9/1994 | Upchurch | 166/250.15 |

FOREIGN PATENT DOCUMENTS

| | | |
|---|---|---|
| 2 305 196 | 4/1997 | United Kingdom . |
| WO 96/24745 | 8/1996 | WIPO . |

*Primary Examiner*—Michael Horabik
*Assistant Examiner*—Albert K. Wong
*Attorney, Agent, or Firm*—Cantor Colburn LLP

[57] ABSTRACT

A plurality of downhole control systems interconnected by a network including a server for monitoring and controlling network communications. Each downhole control system is associated with a zone in one or more wells. The downhole control systems communicate directly with each other transferring information and commands as necessary. The downhole server monitors network communications to resolve data collisions and provides supervisory functions.

10 Claims, 13 Drawing Sheets

WELL CONTROL SYSTEMS EMPLOYING DOWNHOLE NETWORK

CROSS-REFERENCE TO RELATED APPLICATIONS

This application is a continuation-in-part of application Ser. No. 08/856,656 filed May 15, 1997, which is a continuation-in-part of application Ser. No. 08/695,450 filed Aug. 12, 1996 (Now U.S. Pat. No. 5,662,165), which is a divisional of application Ser. No. 08/526,827 filed Sep. 11, 1995 (now U.S. Pat. No. 5,730,219), which is a continuation-in-part of application Ser. No. 08/386,480 filed Feb. 9, 1995 (now U.S. Pat. No. 5,597,042) and this application claims the benefit of Provisional Application Serial No. 60/028,846 filed Sep. 23, 1996.

BACKGROUND OF THE INVENTION

1. Field of the Invention

This invention relates generally to a method and apparatus for the control of oil and gas production wells. More particularly, this invention relates to a method and apparatus for automatically controlling petroleum production wells using downhole, computerized control systems. This invention also relates to a control system for controlling production wells, including multiple zones within a single well, from a remote location.

2. The Prior Art

The control of oil and gas production wells constitutes an on-going concern of the petroleum industry due, in part, to the enormous monetary expense involved as well as the risks associated with environmental and safety issues.

Production well control has become particularly important and more complex in view of the industry wide recognition that wells having multiple branches (i.e., multilateral wells) will be increasingly important and commonplace. Such multilateral wells include discrete production zones which produce fluid in either common or discrete production tubing. In either case, there is a need for controlling zone production, isolating specific zones and otherwise monitoring each zone in a particular well.

Before describing the current state-of-the-art relative to such production well control systems and methods, a brief description will be made of the production systems, per se, in need of control. One type of production system utilizes electrical submersible pumps (ESP) for pumping fluids from downhole. In addition, there are two other general types of productions systems for oil and gas wells, namely plunger lift and gas lift. Plunger lift production systems include the use of a small cylindrical plunger which travels through tubing extending from a location adjacent the producing formation down in the borehole to surface equipment located at the open end of the borehole. In general, fluids which collect in the borehole and inhibit the flow of fluids out of the formation and into the wellbore, are collected in the tubing. Periodically, the end of the tubing is opened at the surface and the accumulated reservoir pressure is sufficient to force the plunger up the tubing. The plunger carries with it to the surface a load of accumulated fluids which are ejected out the top of the well thereby allowing gas to flow more freely from the formation into the wellbore and be delivered to a distribution system at the surface. After the flow of gas has again become restricted due to the further accumulation of fluids downhole, a valve in the tubing at the surface of the well is closed so that the plunger then falls back down the tubing and is ready to lift another load of fluids to the surface upon the reopening of the valve.

A gas lift production system includes a valve system for controlling the injection of pressurized gas from a source external to the well, such as another gas well or a compressor, into the borehole. The increased pressure from the injected gas forces accumulated formation fluids up a central tubing extending along the borehole to remove the fluids and restore the free flow of gas and/or oil from the formation into the well. In wells where liquid fall back is a problem during gas lift, plunger lift may be combined with gas lift to improve efficiency.

In both plunger lift and gas lift production systems, there is a requirement for the periodic operation of a motor valve at the surface of the wellhead to control either the flow of fluids from the well or the flow of injection gas into the well to assist in the production of gas and liquids from the well. These motor valves are conventionally controlled by timing mechanisms and are programmed in accordance with principles of reservoir engineering which determine the length of time that a well should be either "shut in" and restricted from the flowing of gas or liquids to the surface and the time the well should be "opened" to freely produce. Generally, the criteria used for operation of the motor valve is strictly one of the elapse of a preselected time period. In most cases, measured well parameters, such as pressure, temperature, etc. are used only to override the timing cycle in special conditions.

It will be appreciated that relatively simple, timed intermittent operation of motor valves and the like is often not adequate to control either outflow from the well or gas injection to the well so as to optimize well production. As a consequence, sophisticated computerized controllers have been positioned at the surface of production wells for control of downhole devices such as the motor valves.

In addition, such computerized controllers have been used to control other downhole devices such as hydro-mechanical safety valves. These typically microprocessor based controllers are also used for zone control within a well and, for example, can be used to actuate sliding sleeves or packers by the transmission of a surface command to downhole microprocessor controllers and/or electromechanical control devices.

The surface controllers are often hardwired to downhole sensors which transmit information to the surface such as pressure, temperature and flow. This data is then processed at the surface by the computerized control system. Electrically submersible pumps use pressure and temperature readings received at the surface from downhole sensors to change the speed of the pump in the borehole. As an alternative to downhole sensors, wire line production logging tools are also used to provide downhole data on pressure, temperature, flow, gamma ray and pulse neutron using a wire line surface unit. This data is then used for control of the production well.

There are numerous prior art patents related to the control of oil and gas production wells. In general, these prior patents relate to (1) surface control systems using a surface microprocessor and (2) downhole control systems which are initiated by surface control signals.

The surface control system patents generally disclose computerized systems for monitoring and controlling a gas/oil production well whereby the control electronics is located at the surface and communicates with sensors and electromechanical devices near the surface. An example of a system of this type is described in U.S. Pat. No. 4,633,954 ('954) to Dixon et al. The system described in the '954 patent includes a fully programmable microprocessor controller which monitors downhole parameters such as pressure and flow and controls the operation of gas injection to the well, outflow of fluids from the well or shutting in of the well to maximize output of the well. This particular system includes battery powered solid state circuitry comprising a keyboard, a programmable memory, a microprocessor, control circuitry and a liquid crystal display. Another example of a control system of this type is described in U.S. Pat. No. 5,132,904 ('904) to Lamp. The '904 patent discloses a system similar to the '954 patent and in addition also describes a feature wherein the controller includes serial and parallel communication ports through which all communications to and from the controller pass. Hand held devices or portable computers capable of serial communication may access the controller. A telephone modem or telemetry link to a central host computer may also be used to permit several controllers to be accessed remotely.

U.S. Pat. No. 4,757,314 ('314) to Aubin et al describes an apparatus for controlling and monitoring a well head submerged in water. This system includes a plurality of sensors, a plurality of electromechanical valves and an electronic control system which communicates with the sensors and valves. The electronic control system is positioned in a water tight enclosure and the water tight enclosure is submerged underwater. The electronics located in the submerged enclosure control and operate the electromechanical valves based on input from the sensors. In particular, the electronics in the enclosure uses the decision making abilities of the microprocessor to monitor the cable integrity from the surface to the well head to automatically open or close the valves should a break in the line occur.

The downhole control system patents generally disclose downhole microprocessor controllers, electromechanical control devices and sensors. Examples include U.S. Pat. Nos. 4,915,168 ('168) to Upchurch and 5,273,112 ('112) to Schultz. However, in each and every case, the microprocessor controllers transmit control signals only upon actuation from a surface or other external control signal. There is no teaching in any of these patents that the downhole microprocessor controllers themselves may automatically initiate the control of the electromechanical devices based on pre-programmed instructions. Similarly, none of the aforementioned patents directed to microprocessor based control systems for controlling the production from oil and gas wells, including the aforementioned '954, '904 and '314 patents, disclose the use of downhole electronic controllers, electromechanical control devices and sensors whereby the electronic control units will automatically control the electromechanical devices based on input from the sensor without the need for a surface or other external control signal.

It will be appreciated that the downhole control system of the types disclosed in the '168 and '112 patents are closely analogous to the surface based control systems such as disclosed in the '954, '904 and '314 patents in that a surface controller is required at each well to initiate and transmit the control instructions to the downhole microprocessor. Thus, in all cases, some type of surface controller and associated support platform at each well is needed. While it is well recognized that petroleum production wells will have increased production efficiencies and lower operating costs if surface computer based controllers and downhole microprocessor controller (actuated by external or surface signals) of the type discussed hereinabove are used, the presently implemented control systems nevertheless suffer from drawbacks and disadvantages. For example, as mentioned, all of these prior art systems generally require a surface platform at each well for supporting the control electronics and associated equipment. However, in many instances, the well operator would rather forego building and maintaining the costly platform. Thus, a problem is encountered in that use of present surface controllers require the presence of a location for the control system, namely the platform. Still another problem associated with known surface control systems such as the type disclosed in the '168 and '112 patents wherein a downhole microprocessor is actuated by a surface signal is the reliability of surface to downhole signal integrity. It will be appreciated that should the surface signal be in any way compromised on its way downhole, then important control operations (such as preventing water from flowing into the production tubing) will not take place as needed.

In multilateral wells where multiple zones are controlled by a single surface control system, an inherent risk is that if the surface control system fails or otherwise shuts down, then all of the downhole tools and other production equipment in each separate zone will similarly shut down leading to a large loss in production and, of course, a loss in revenue.

Still another significant drawback of present production well control systems involves the extremely high cost associated with implementing changes in well control and related workover operations. Presently, if a problem is detected at the well, the customer is required to send a rig to the wellsite at an extremely high cost (e.g., 5 million dollars for 30 days of offshore work). The well must then be shut in during the workover causing a large loss in revenues (e.g., 1.5 million dollars for a 30 day period). Associated with these high costs are the relatively high risks of adverse environmental impact due to spills and other accidents as well as potential liability of personnel at the rig site. Of course, these risks can lead to even further costs. Because of the high costs and risks involved, in general, a customer may delay important and necessary workover of a single well until other wells in that area encounter problems. This delay may cause the production of the well to decrease or be shut in until the rig is brought in.

Still other problems associated with present production well control systems involve the need for wireline formation evaluation to sense changes in the formation and fluid composition. Unfortunately, such wireline formation evaluation is extremely expensive and time consuming. In addition, it requires shut-in of the well and does not provide "real time" information. The need for real time information regarding the formation and fluid is especially acute in evaluating undesirable water flow into the production fluids.

SUMMARY OF THE INVENTION

The above-discussed and other problems and deficiencies of the prior art are overcome or alleviated by the production well control system of the present invention. In accordance with a first embodiment of the present invention, a downhole production well control system is provided for automatically controlling downhole tools in response to sensed selected downhole parameters. An important feature of this invention is that the automatic control is initiated downhole without an initial control signal from the surface or from some other external source.

The first embodiment of the present invention generally comprises downhole sensors, downhole electromechanical devices and downhole computerized control electronics whereby the control electronics automatically control the electromechanical devices based on input from the downhole sensors. Thus, using the downhole sensors, the downhole computerized control system will monitor actual downhole parameters (such as pressure, temperature, flow, gas influx, etc.) and automatically execute control instructions when the monitored downhole parameters are outside a selected operating range (e.g., indicating an unsafe condition). The automatic control instructions will then cause an electromechanical control device (such as a valve) to actuate a suitable tool (for example, actuate a sliding sleeve or packer; or close a pump or other fluid flow device).

The downhole control system of this invention also includes transceivers for two-way communication with the surface as well as a telemetry device for communicating from the surface of the production well to a remote location.

The downhole control system is preferably located in each zone of a well such that a plurality of wells associated with one or more platforms will have a plurality of downhole control systems, one for each zone in each well. The downhole control systems have the ability to communicate with other downhole control systems in other zones in the same or different wells. In addition, as discussed in more detail with regard to the second embodiment of this invention, each downhole control system in a zone may also communicate with a surface control system. The downhole control system of this invention thus is extremely well suited for use in connection with multilateral wells which include multiple zones.

The selected operating range for each tool controlled by the downhole control system of this invention is programmed in a downhole memory either before or after the control system is lowered downhole. The aforementioned transceiver may be used to change the operating range or alter the programming of the control system from the surface of the well or from a remote location.

A power source provides energy to the downhole control system. Power for the power source can be generated in the borehole (e.g., by a turbine generator), at the surface or be supplied by energy storage devices such as batteries (or a combination of one or more of these power sources). The power source provides electrical voltage and current to the downhole electronics, electromechanical devices and sensors in the borehole.

In contrast to the aforementioned prior art well control systems which consist either of computer systems located wholly at the surface or downhole computer systems which require an external (e.g., surface) initiation signal (as well as a surface control system), the downhole well production control system of this invention automatically operates based on downhole conditions sensed in real time without the need for a surface or other external signal. This important feature constitutes a significant advance in the field of production well control. For example, use of the downhole control system of this invention obviates the need for a surface platform (although such surface platforms may still be desirable in certain applications such as when a remote monitoring and control facility is desired as discussed below in connection with the second embodiment of this invention). The downhole control system of this invention is also inherently more reliable since no surface to downhole actuation signal is required and the associated risk that such an actuation signal will be compromised is therefore rendered moot. With regard to multilateral (i.e., multi-zone) wells, still another advantage of this invention is that, because the entire production well and its multiple zones are not controlled by a single surface controller, then the risk that an entire well including all of its discrete production zones will be shut-in simultaneously is greatly reduced.

In accordance with a second embodiment of the present invention, a system adapted for controlling and/or monitoring a plurality of production wells from a remote location is provided. This system is capable of controlling and/or monitoring:

(1) a plurality of zones in a single production well;

(2) a plurality of zones/wells in a single location (e.g., a single platform); or (3) a plurality of zones/wells located at a plurality of locations (e.g., multiple platforms).

The multizone and/or multiwell control system of this invention is composed of multiple downhole electronically controlled electromechanical devices (sometimes referred to as downhole modules), and multiple computer based surface systems operated from multiple locations. Important functions for these systems include the ability to predict the future flow profile of multiple wells and to monitor and control the fluid or gas flow from either the formation into the wellbore, or from the wellbore to the surface. The control system of the second embodiment of this invention is also capable of receiving and transmitting data from multiple remote locations such as inside the borehole, to or from other platforms, or from a location away from any well site.

The downhole control devices interface to the surface system using either a wireless communication system or through an electrical hard wired connection. The downhole control systems in the wellbore can transmit and receive data and/or commands to/from the surface system. The data transmission from inside the wellbore can be done by allowing the surface system to poll each individual device in the hole, although individual devices will be allowed to take control of the communications during an emergency. The devices downhole may be programmed while in the wellbore by sending the proper command and data to adjust the parameters being monitored due to changes in borehole and flow conditions and/or to change its primary function in the wellbore.

The surface system may control the activities of the downhole modules by requesting data on a periodic basis, and commanding the modules to open or close the electromechanical control devices, and/or change monitoring parameters due to changes in long term borehole conditions. The surface system at one location will be capable of interfacing with a system in another location via phone lines, satellite communication or other communicating means. Preferably, a remote central control system controls and/or monitors all of the zones, wells and/or platforms from a single remote location.

In accordance with a third embodiment of the present invention, the downhole control systems are associated with permanent downhole formation evaluation sensors which remain downhole throughout production operations. These formation evaluation sensors for formation measurements may include, for example, gamma ray detection for formation evaluation, neutron porosity, resistivity, acoustic sensors and pulse neutron which can, in real time, sense and evaluate formation parameters including important information regarding water migrating from different zones. Significantly, this information can be obtained prior to the water actually entering the producing tubing and therefore corrective action (i.e., closing of a valve or sliding sleeve) or formation treatment can be taken prior to water being produced. This real time acquisition of formation data in the production well constitutes an important advance over current wireline techniques in that the present invention is far less costly and can anticipate and react to potential problems before they occur. In addition, the formation evaluation sensors themselves can be placed much closer to the actual formation (i.e., adjacent the casing or downhole completion tool) then wireline devices which are restricted to the interior of the production tubing.

The above-discussed and other features and advantages of the present invention will be appreciated by and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF THE INVENTION

This invention relates to a system for controlling production wells from a remote location. In particular, in an embodiment of the present invention, a control and monitoring system is described for controlling and/or monitoring at least two zones in a single well from a remote location. The present invention also includes the remote control and/or monitoring of multiple wells at a single platform (or other location) and/or multiple wells located at multiple platforms or locations. Thus, the control system of the present invention has the ability to control individual zones in multiple wells on multiple platforms, all from a remote location. The control and/or monitoring system of this invention is comprised of a plurality of surface control systems or modules located at each well head and one or more downhole control systems or modules positioned within zones located in each well. These subsystems allow monitoring and control from a single remote location of activities in different zones in a number of wells in near real time.

Figure 6:
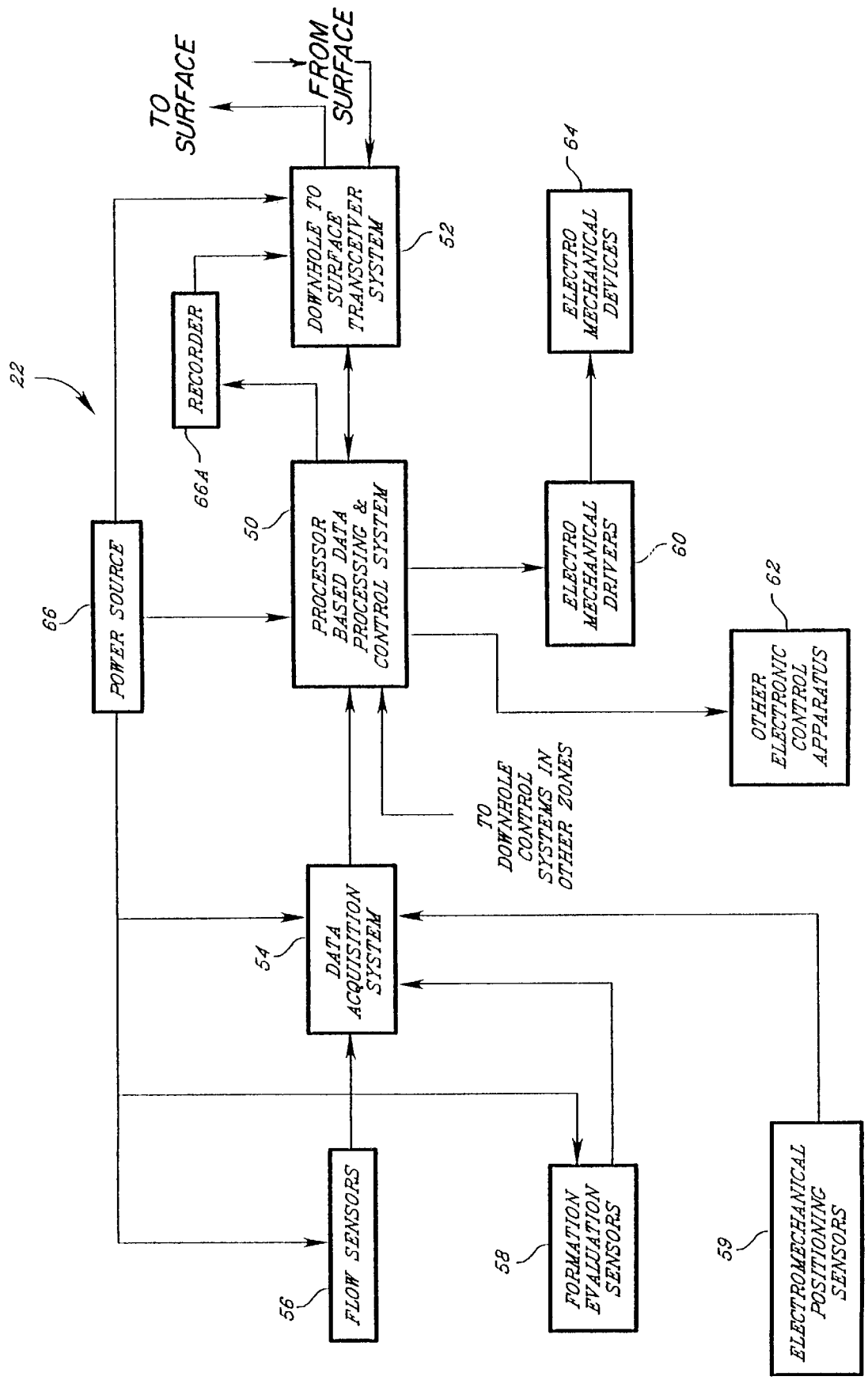
FIG. 6 is a block diagram depicting a downhole production well control system in accordance with the present invention.

As will be discussed in some detail hereinafter in connection with FIGS. 2, 6 and 7, in accordance with a preferred embodiment of the present invention, the downhole control system is composed of downhole sensors, downhole control electronics and downhole electromechanical modules that can be placed in different locations (e.g., zones) in a well, with each downhole control system having a unique electronics address. A number of wells can be outfitted with these downhole control devices. The surface control and monitoring system interfaces with all of the wells where the downhole control devices are located to poll each device for data related to the status of the downhole sensors attached to the module being polled. In general, the surface system allows the operator to control the position, status, and/or fluid flow in each zone of the well by sending a command to the device being controlled in the wellbore.

As will be discussed hereinafter, the downhole control modules for use in the multizone or multiwell control system of this invention may either be controlled using an external or surface command as is known in the art or the downhole control system may be actuated automatically in accordance with a novel control system which controls the activities in the wellbore by monitoring the well sensors connected to the data acquisition electronics. In the latter case, a downhole computer (e.g., microprocessor) will command a downhole tool such as a packer, sliding sleeve or valve to open, close, change state or do whatever other action is required if certain sensed parameters are outside the normal or preselected well zone operating range. This operating range may be programmed into the system either prior to being placed in the borehole or such programming may be effected by a command from the surface after the downhole control module has been positioned downhole in the wellbore.

Figure 1:
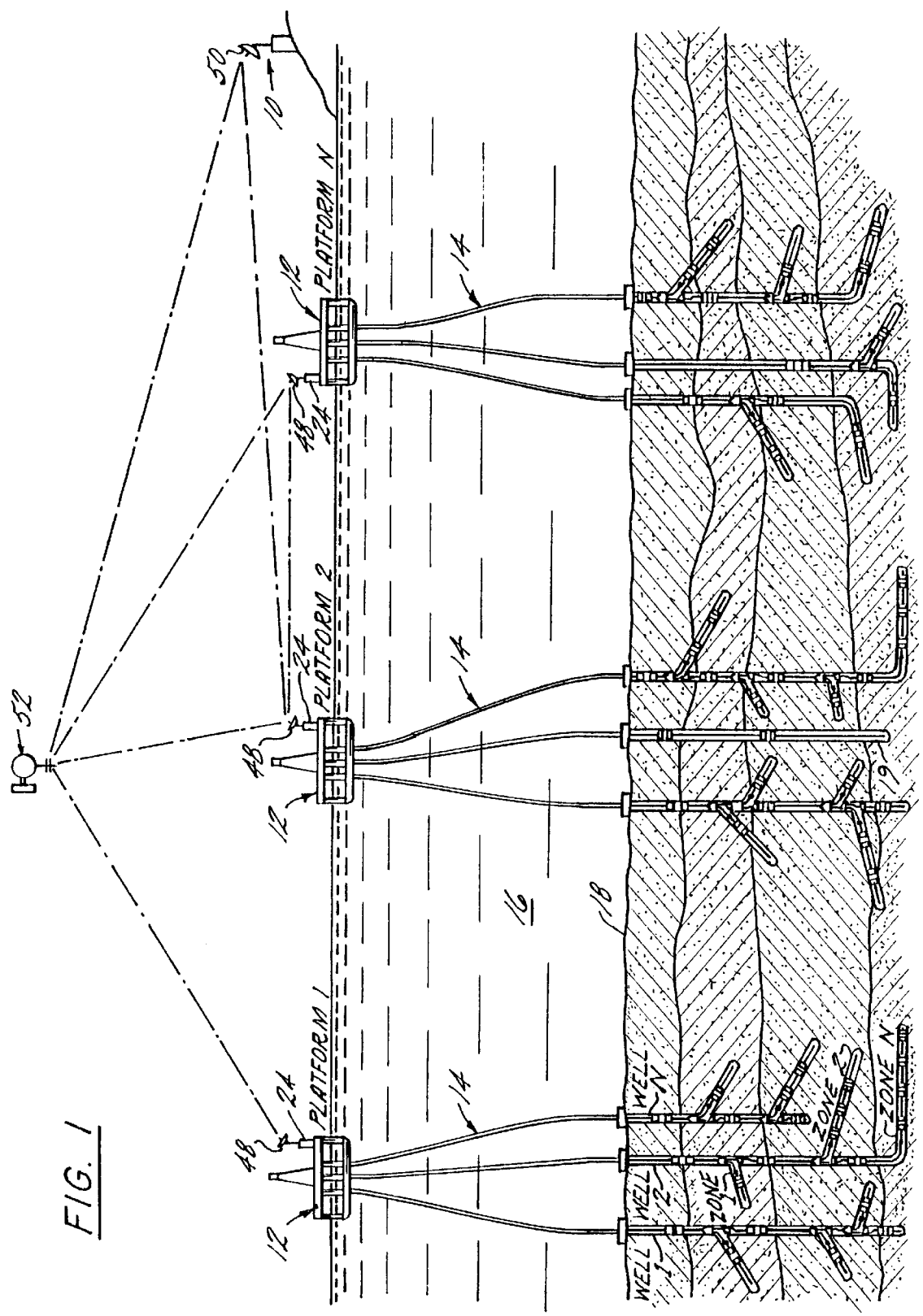
FIG. 1 is a diagrammatic view depicting the multiwell/multizone control system of the present invention for use in controlling a plurality of offshore well platforms.
Figure 4:
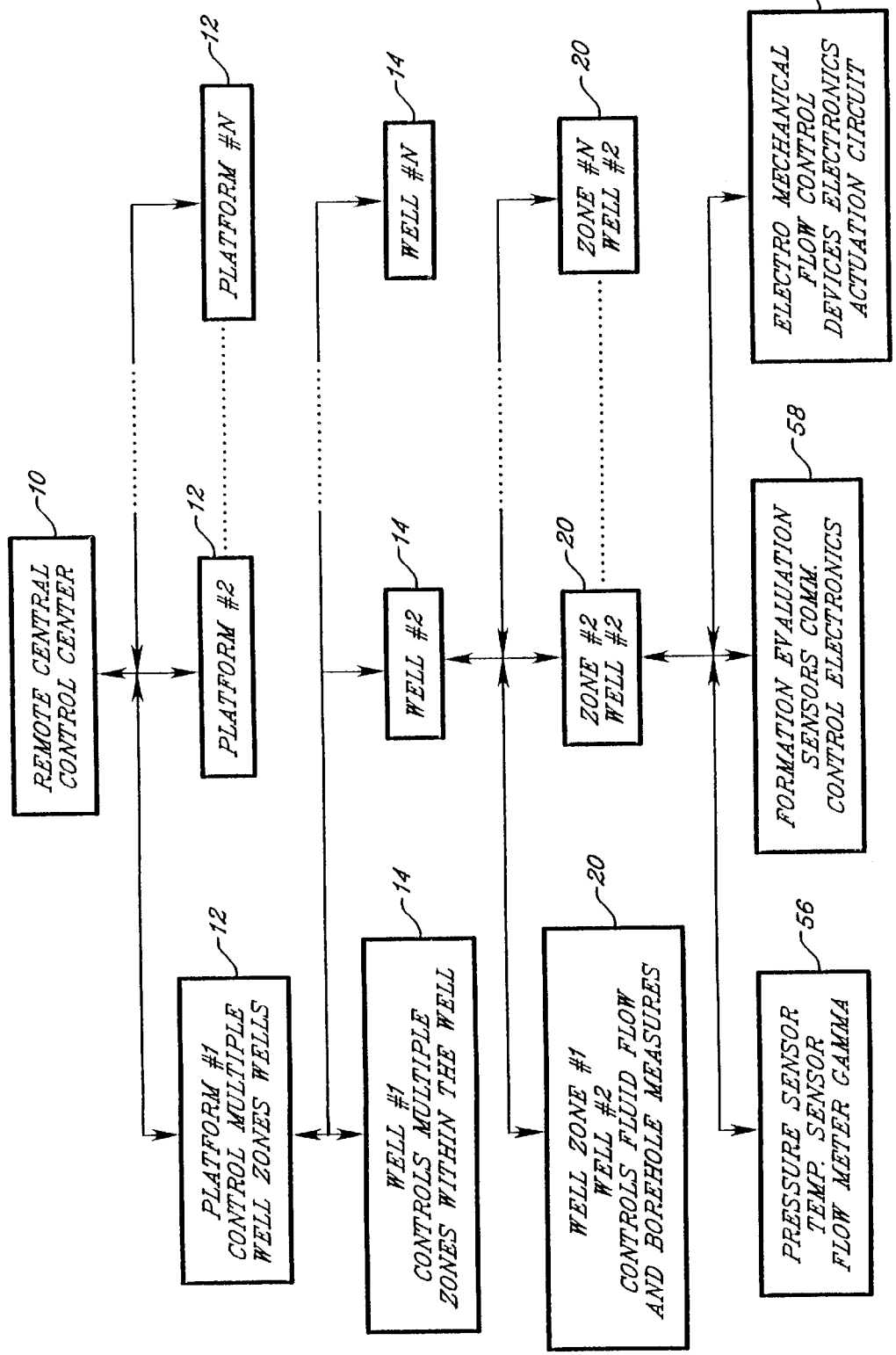
FIG. 4 is a block diagram depicting the multiwell/multizone control system in accordance with the present invention.

Referring now to FIGS. 1 and 4, the multiwell/multizone monitoring and control system of the present invention may include a remote central control center 10 which communicates either wirelessly or via telephone wires to a plurality of well platforms 12. It will be appreciated that any number of well platforms may be encompassed by the control system of the present invention with three platforms namely, platform 1, platform 2, and platform N being shown in FIGS. 1 and 4. Each well platform has associated therewith a plurality of wells 14 which extend from each platform 12 through water 16 to the surface of the ocean floor 18 and then downwardly into formations under the ocean floor. It will be appreciated that while offshore platforms 12 have been shown in FIG. 1, the group of wells 14 associated with each platform are analogous to groups of wells positioned together in an area of land; and the present invention therefore is also well suited for control of land based wells.

As mentioned, each platform 12 is associated with a plurality of wells 14. For purposes of illustration, three wells are depicted as being associated with platform number 1 with each well being identified as well number 1, well number 2 and well number N. As is known, a given well may be divided into a plurality of separate zones which are required to isolate specific areas of a well for purposes of producing selected fluids, preventing blowouts and preventing water intake. Such zones may be positioned in a single vertical well such as well 19 associated with platform 2 shown in FIG. 1 or such zones can result when multiple wells are linked or otherwise joined together. A particularly significant contemporary feature of well production is the drilling and completion of lateral or branch wells which extend from a particular primary wellbore. These lateral or branch wells can be completed such that each lateral well constitutes a separable zone and can be isolated for selected production. A more complete description of wellbores containing one or more laterals (known as multilaterals) can be found in U.S. Pat. Nos. 4,807,407, 5,325,924 and U.S. application Ser. No. 08/187,277 (now U.S. Pat. No. 5,411,082), all of the contents of each of those patents and applications being incorporated herein by reference.

With reference to FIGS. 1–4, each of the wells 1, 2 and 3 associated with platform 1 include a plurality of zones which need to be monitored and/or controlled for efficient production and management of the well fluids. For example, with reference to FIG. 2, well number 2 includes three zones, namely zone number 1, zone number 2 and zone number N. Each of zones 1, 2 and N have been completed in a known manner; and more particularly have been completed in the manner disclosed in aforementioned application Ser. No. 08/187,277. Zone number 1 has been completed using a known slotted liner completion, zone number 2 has been completed using an open hole selective completion and zone number N has been completed using a cased hole selective completion with sliding sleeves. Associated with each of zones 1, 2 and N is a downhole control system 22. Similarly, associated with each well platform 1, 2 and N is a surface control system 24.

As discussed, the multiwell/multizone control system of the present invention is comprised of multiple downhole electronically controlled electromechanical devices and multiple computer based surface systems operated form multiple locations. An important function of these systems is to predict the future flow profile of multiple wells and monitor and control the fluid or gas flow from the formation into the wellbore and from the wellbore into the surface. The system is also capable of receiving and transmitting data from multiple locations such as inside the borehole, and to or from other platforms 1, 2 or N or from a location away from any well site such as central control center 10.

Figure 5:
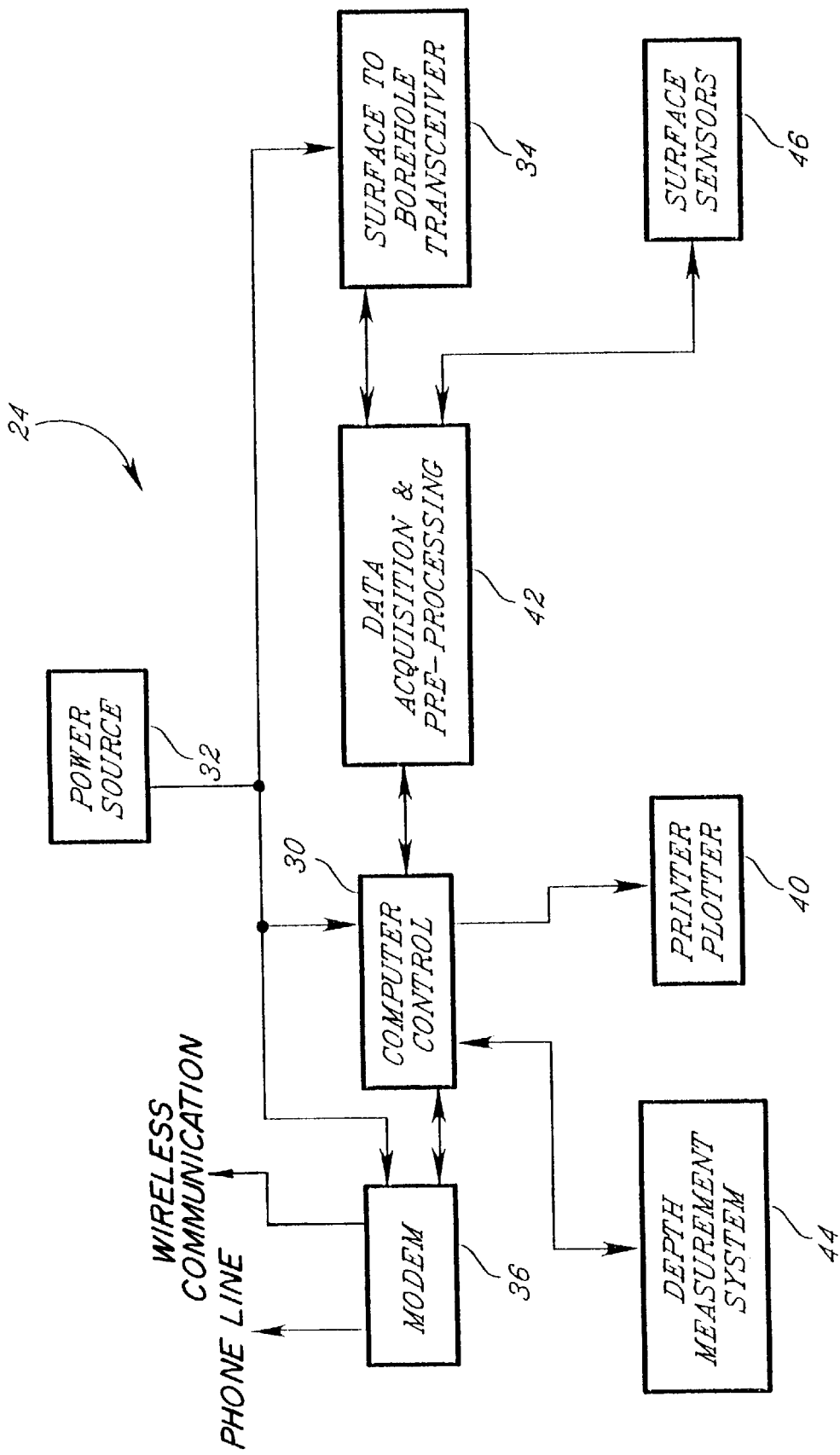
FIG. 5 is a block diagram depicting a surface control system for use with the multiwell/multizone control system of the present invention.

The downhole control systems 22 will interface to the surface system 24 using a wireless communication system or through an electrical wire (i.e., hardwired) connection. The downhole systems in the wellbore can transmit and receive data and/or commands to or from the surface and/or to or from other devices in the borehole. Referring now to FIG. 5, the surface system 24 is composed of a computer system 30 used for processing, storing and displaying the information acquired downhole and interfacing with the operator. Computer system 30 may be comprised of a personal computer or a work station with a processor board, short term and long term storage media, video and sound capabilities as is well know. Computer control 30 is powered by power source 32 for providing energy necessary to operate the surface system 24 as well as any downhole system 22 if the interface is accomplished using a wire or cable. Power will be regulated and converted to the appropriate values required to operate any surface sensors (as well as a downhole system if a wire connection between surface and downhole is available).

A surface to borehole transceiver 34 is used for sending data downhole and for receiving the information transmitted from inside the wellbore to the surface. The transceiver converts the pulses received from downhole into signals compatible with the surface computer system and converts signals from the computer 30 to an appropriate communications means for communicating downhole to downhole control system 22. Communications downhole may be effected by a variety of known methods including hardwiring and wireless communications techniques. A preferred technique transmits acoustic signals down a tubing string such as production tubing string 38 (see FIG. 2) or coiled tubing. Acoustical communication may include variations of signal frequencies, specific frequencies, or codes or acoustical signals or combinations of these. The acoustical transmission media may include the tubing string as illustrated in U.S. Pat. Nos. 4,375,239; 4,347,900 or 4,378,850, all of which are incorporated herein by reference. Alternatively, the acoustical transmission may be transmitted through the casing stream, electrical line, slick line, subterranean soil around the well, tubing fluid or annulus fluid. A preferred acoustic transmitter is described in U.S. Pat. No. 5,222,049, all of the contents of which is incorporated herein by reference thereto, which discloses a ceramic piezoelectric based transceiver. The piezoelectric wafers that compose the transducer are stacked and compressed for proper coupling to the medium used to carry the data information to the sensors in the borehole. This transducer will generate a mechanical force when alternating current voltage is applied to the two power inputs of the transducer. The signal generated by stressing the piezoelectric wafers will travel along the axis of the borehole to the receivers located in the tool assembly where the signal is detected and processed. The transmission medium where the acoustic signal will travel in the borehole can be production tubing or coil tubing.

Communications can also be effected by sensed downhole pressure conditions which may be natural conditions or which may be a coded pressure pulse or the like introduced into the well at the surface by the operator of the well. Suitable systems describing in more detail the nature of such coded pressure pulses are described in U.S. Pat. Nos. 4,712,613 to Nieuwstad, 4,468,665 to Thawley, 3,233,674 to Leutwyler and 4,078,620 to Westlake; 5,226,494 to Rubbo et al and 5,343,963 to Bouldin et al. Similarly, the aforementioned '168 patent to Upchurch and '112 patent to Schultz also disclose the use of coded pressure pulses in communicating from the surface downhole.

Figure 5A:
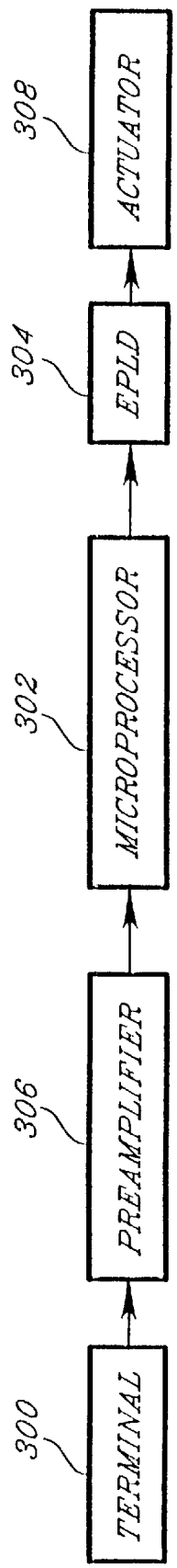
FIG. 5A is a block diagram of a communications system using sensed downhole pressure conditions.
Figure 5B:
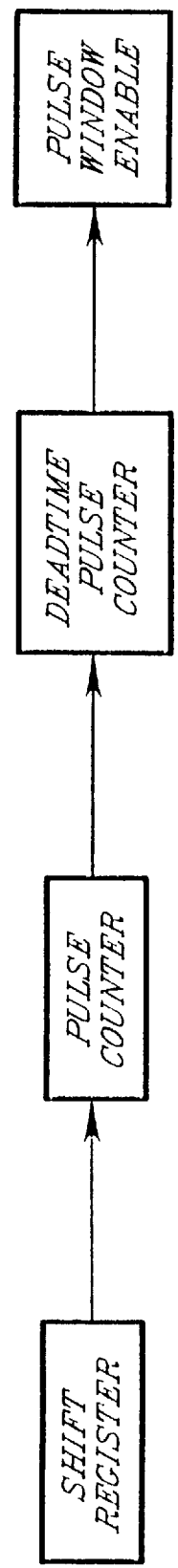
FIG. 5B is a block diagram of a portion of the communications system of FIG. 5A.

A preferred system for sensing downhole pressure conditions is depicted in FIGS. 5A and 5B. Referring to FIG. 5A, this system includes a handheld terminal 300 used for programming the tool at the surface, batteries (not shown) for powering the electronics and actuation downhole, a microprocessor 302 used for interfacing with the handheld terminal and for setting the frequencies to be used by the Erasable Programmable Logic Device (EPLD) 304 for activation of the drivers, preamplifiers 306 used for conditioning the pulses from the surface, counters (EPLD) 304 used for the acquisition of the pulses transmitted from the surface for determination of the pulse frequencies, and to enable the actuators 306 in the tool; and actuators 308 used for the control and operation of electromechanical devices and/or ignitors.

Referring to FIG. 5B, the EPLD system 304 is preferably comprised of six counters: A four bit counter for surface pulse count and for control of the actuation of the electromechanical devices. A 10 bit counter to reduce the frequency of Clock in from 32.768 KHz to 32 Hz; and a 10 bit counter to count the deadtime frequency. Two counters are used to determine the proper frequency of pulses. Only one frequency counter is enabled at any time. A shift register is set by the processor to retain the frequency settings. The 10 bit devices also enable the pulse counter to increment the count if a pulse is received after the deadtime elapse, and before the pulse window count of six seconds expire. The system will be reset if a pulse is not received during the six seconds valid period. An AND gate is located between the input pulses and the clock in the pulse counter. The AND gate will allow the pulse from a strain gauge to reach the counter if the enable line from the 10 bit counter is low. A two input OR gate will reset the pulse counter from the 10 bit counter or the master reset from the processor. A three input OR gate will be used for resetting the 11, 10 bit counters, as well as the frequency counters.

The communications system of of FIGS. 5A and 5B may operate as follows:

1. Set the tool address (frequencies) using the handheld terminal at the surface;

2. Use the handheld terminal to also set the time delay for the tool to turn itself on and listen to the pulses transmitted from the surface;

3. The processor 302 will set the shift register with a binary number which will indicate to the counters the frequencies (address) it should acknowledge for operation of the actuators;

4. The operator will use an appropriate transmitter at the surface system 24 to generate the proper frequencies to be sent to the tool downhole;

5. The downhole electronics 22 will receive the pulses from the surface, determine if they are valid, and turn on or off the actuators;

6. In one preferred embodiment described in steps 6–8, there are a total of sixteen different frequencies that can be used to activate the systems downhole. Each downhole system will require two frequencies to be sent from the surface for proper activation.

7. The surface system 24 will interface to the tools' processor 302 to set the two frequencies for communication and activation of the systems in the borehole. Each frequency spaced at multiples of 30 seconds intervals is composed of four pulses. A system downhole will be activated when 8 pulses at the two preset frequencies are received by the electronics in the tool. There has to be 4 pulses at one frequency followed by 4 pulses at a second frequency.

5. A counter will monitor the frequencies downhole and will reset the hardware if a pulse is not received within a 6 second window.

Also, other suitable communications techniques include radio transmission from the surface location or from a subsurface location, with corresponding radio feedback from the downhole tools to the surface location or subsurface location; the use of microwave transmission and reception; the use of fiber optic communications through a fiber optic cable suspended from the surface to the downhole control package; the use of electrical signaling from a wire line suspended transmitter to the downhole control package with subsequent feedback from the control package to the wire line suspended transmitter/receiver. Communication may also consist of frequencies, amplitudes, codes or variations or combinations of these parameters or a transformer coupled technique which involves wire line conveyance of a partial transformer to a downhole tool. Either the primary or secondary of the transformer is conveyed on a wire line with the other half of the transformer residing within the downhole tool. When the two portions of the transformer are mated, data can be interchanged.

Figure 5C:
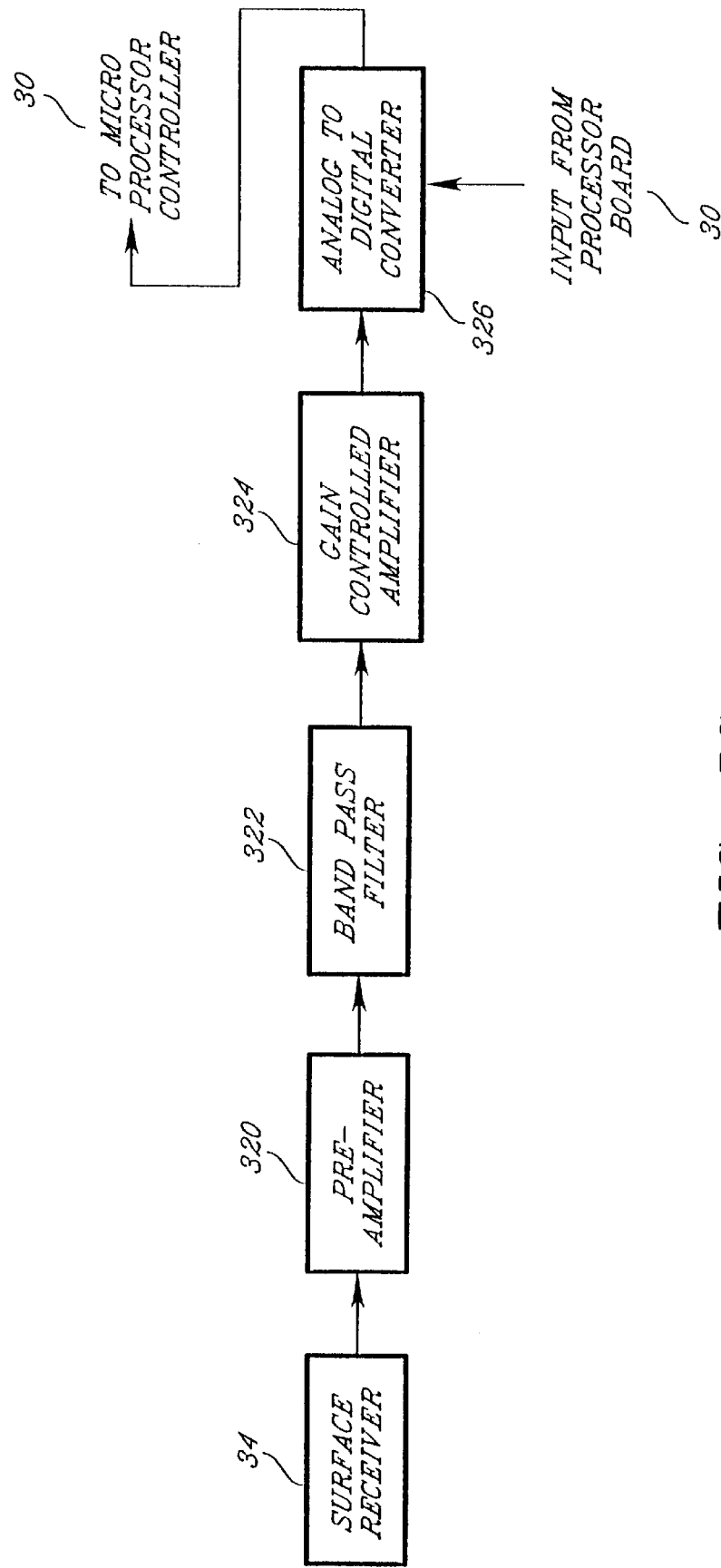
FIG. 5C is a block diagram of the data acquisition system used in the surface control system of FIG. 5.

Referring again to FIG. 5, the control surface system 24 further includes a printer/plotter 40 which is used to create a paper record of the events occurring in the well. The hard copy generated by computer 30 can be used to compare the status of different wells, compare previous events to events occurring in existing wells and to get formation evaluation logs. Also communicating with computer control 30 is a data acquisition system 42 which is used for interfacing the well transceiver 34 to the computer 30 for processing. The data acquisition system 42 is comprised of analog and digital inputs and outputs, computer bus interfaces, high voltage interfaces and signal processing electronics. An embodiment of data acquisition sensor 42 is shown in FIG. 5C and includes a pre-amplifier 320, band pass filter 322, gain controlled amplifier 324 and analog to digital converter 326. The data acquisition system (ADC) will process the analog signals detected by the surface receiver to conform to the required input specifications to the microprocessor based data processing and control system. The surface receiver 34 is used to detect the pulses received at the surface from inside the wellbore and convert them into signals compatible with the data acquisition preamplifier 320. The signals from the transducer will be low level analog voltages. The preamplifier 320 is used to increase the voltage levels and to decrease the noise levels encountered in the original signals from the transducers. Preamplifier 320 will also buffer the data to prevent any changes in impedance or problems with the transducer from damaging the electronics. The bandpass filter 322 eliminates the high and low frequency noises that are generated from external sources. The filter will allow the signals associated with the transducer frequencies to pass without any significant distortion or attenuation. The gain controlled amplifier 324 monitors the voltage level on the input signal and amplifies or attenuates it to assure that it stays within the acquired voltage ranges. The signals are conditioned to have the highest possible range to provide the largest resolution that can be achieved within the system. Finally, the analog to digital converter 326 will transform the analog signal received from the amplifier into a digital value equivalent to the voltage level of the analog signal. The conversion from analog to digital will occur after the microprocessor 30 commands the tool to start a conversion. The processor system 30 will set the ADC to process the analog signal into 8 or 16 bits of information. The ADC will inform the processor when a conversion is taking place and when it is competed. The processor 30 can at any time request the ADC to transfer the acquired data to the processor.

Still referring to FIG. 5, the electrical pulses from the transceiver 34 will be conditioned to fit within a range where the data can be digitized for processing by computer control 30. Communicating with both computer control 30 and transceiver 34 is a previously mentioned modem 36. Modem 36 is available to surface system 24 for transmission of the data from the well site to a remote location such as remote location 10 or a different control surface system 24 located on, for example, platform 2 or platform N. At this remote location, the data can be viewed and evaluated, or again, simply be communicated to other computers controlling other platforms. The remote computer 10 can take control over system 24 interfacing with the downhole control modules 22 and acquired data from the wellbore and/or control the status of the downhole devices and/or control the fluid flow from the well or from the formation. Also associated with the control surface system 24 is a depth measurement system which interfaces with computer control system 30 for providing information related to the location of the tools in the borehole as the tool string is lowered into the ground. Finally, control surface system 24 also includes one or more surface sensors 46 which are installed at the surface for monitoring well parameters such as pressure, rig pumps and heave, all of which can be connected to the surface system to provide the operator with additional information on the status of the well.

Surface system 24 can control the activities of the downhole control modules 22 by requesting data on a periodic basis and commanding the downhole modules to open, or close electromechanical devices and to change monitoring parameters due to changes in long term borehole conditions. As shown diagrammatically in FIG. 1, surface system 24, at one location such as platform 1, can interface with a surface system 24 at a different location such as platforms 2 or N or the central remote control sensor 10 via phone lines or via wireless transmission. For example, in FIG. 1, each surface system 24 is associated with an antenna 48 for direct communication with each other (i.e., from platform 2 to platform N), for direct communication with an antenna 50 located at central control system 10 (i.e., from platform 2 to control system 10) or for indirect communication via a satellite 52. Thus, each surface control center 24 includes the following functions:

1. Polls the downhole sensors for data information;

2. Processes the acquired information from the wellbore to provide the operator with formation, tools and flow status;

3. Interfaces with other surface systems for transfer of data and commands; and

4. Provides the interface between the operator and the downhole tools and sensors.

In a less preferred embodiment of the present invention, the downhole control system 22 may be comprised of any number of known downhole control systems which require a signal from the surface for actuation. Examples of such downhole control systems include those described in U.S. Pat. Nos. 3,227,228; 4,796,669; 4,896,722; 4,915,168; 5,050,675; 4,856,595; 4,971,160; 5,273,112; 5,273,113; 5,332,035; 5,293,937; 5,226,494 and 5,343,963, all of the contents of each patent being incorporated herein by reference thereto. All of these patents disclose various apparatus and methods wherein a microprocessor based controller downhole is actuated by a surface or other external signal such that the microprocessor executes a control signal which is transmitted to an electromechanical control device which then actuates a downhole tool such as a sliding sleeve, packer or valve. In this case, the surface control system 24 transmits the actuation signal to downhole controller 22.

Thus, in accordance with an embodiment of this invention, the aforementioned remote central control center 10, surface control centers 24 and downhole control systems 22 all cooperate to provide one or more of the following functions:

1. Provide one or two-way communication between the surface system 24 and a downhole tool via downhole control system 22;

2. Acquire, process, display and/or store at the surface data transmitted from downhole relating to the wellbore fluids, gases and tool status parameters acquired by sensors in the wellbore;

3. Provide an operator with the ability to control tools downhole by sending a specific address and command information from the central control center 10 or from an individual surface control center 24 down into the wellbore;

4. Control multiple tools in multiple zones within any single well by a single remote surface system 24 or the remote central control center 10;

5. Monitor and/or control multiple wells with a single surface system 10 or 24;

6. Monitor multiple platforms from a single or multiple surface system working together through a remote communications link or working individually;

7. Acquire, process and transmit to the surface from inside the wellbore multiple parameters related to the well status, fluid condition and flow, tool state and geological evaluation;

8. Monitor the well gas and fluid parameters and perform functions automatically such as interrupting the fluid flow to the surface, opening or closing of valves when certain acquired downhole parameters such as pressure, flow, temperature or fluid content are determined to be outside the normal ranges stored in the systems' memory (as described below with respect to FIGS. 6 and 7); and 9. Provide operator to system and system to operator interface at the surface using a computer control surface control system.

10. Provide data and control information among systems in the wellbore.

In a preferred embodiment and in accordance with an important feature of the present invention, rather than using a downhole control system of the type described in the aforementioned patents wherein the downhole activities are only actuated by surface commands, the present invention utilizes a downhole control system which automatically controls downhole tools in response to sensed selected downhole parameters without the need for an initial control signal from the surface or from some other external source. Referring to FIGS. 2, 3, 6 and 7, this downhole computer based control system includes a microprocessor based data processing and control system 50.

Electronics control system 50 acquires and processes data sent from the surface as received from transceiver system 52 and also transmits downhole sensor information as received from the data acquisition system 54 to the surface. Data acquisition system 54 will preprocess the analog and digital sensor data by sampling the data periodically and formatting it for transfer to processor 50. Included among this data is data from flow sensors 56, formation evaluation sensors 58 and electromechanical position sensor 59 (these latter sensors 59 provide information on position, orientation and the like of downhole tools). The formation evaluation data is processed for the determination of reservoir parameters related to the well production zone being monitored by the downhole control module. The flow sensor data is processed and evaluated against parameters stored in the downhole module's memory to determine if a condition exists which requires the intervention of the processor electronics 50 to automatically control the electromechanical devices. It will be appreciated that in accordance with an important feature of this invention, the automatic control executed by processor 50 is initiated without the need for a initiation or control signal from the surface or from some other external source. Instead, the processor 50 simply evaluates parameters existing in real time in the borehole as sensed by flow sensors 56 and/or formation evaluations sensors 58 and then automatically executes instructions for appropriate control. Note that while such automatic initiation is an important feature of this invention, in certain situations, an operator from the surface may also send control instructions downwardly from the surface to the transceiver system 52 and into the processor 50 for executing control of downhole tools and other electronic equipment. As a result of this control, the control system 50 may initiate or stop the fluid/gas flow from the geological formation into the borehole or from the borehole to the surface.

The downhole sensors associated with flow sensors 56 and formation evaluations sensors 58 may include, but are not limited to, sensors for sensing pressure, flow, temperature, oil/water content, geological formation, gamma ray detectors and formation evaluation sensors which utilize acoustic, nuclear, resistivity and electromagnetic technology. It will be appreciated that typically, the pressure, flow, temperature and fluid/gas content sensors will be used for monitoring the production of hydrocarbons while the formation evaluation sensors will measure, among other things, the movement of hydrocarbons and water in the formation. The downhole computer (processor 50) may automatically execute instructions for actuating electromechanical drivers 60 or other electronic control apparatus 62. In turn, the electromechanical driver 60 will actuate an electromechanical device for controlling a downhole tool such as a sliding sleeve, shut off device, valve, variable choke, penetrator, perf valve or gas lift tool. As mentioned, downhole computer 50 may also control other electronic control apparatus such as apparatus that may effect flow characteristics of the fluids in the well.

In addition, downhole computer 50 is capable of recording downhole data acquired by flow sensors 56, formation evaluation sensors 58 and electromechanical position sensors 59. This downhole data is recorded in recorder 66. Information stored in recorder 66 may either be retrieved from the surface at some later date when the control system is brought to the surface or data in the recorder may be sent to the transceiver system 52 and then communicated to the surface.

The borehole transmitter/receiver 52 transfers data from downhole to the surface and receives commands and data from the surface and between other downhole modules. Transceiver assembly 52 may consist of any known and suitable transceiver mechanism and preferably includes a device that can be used to transmit as well as to receive the data in a half duplex communication mode, such as an acoustic piezoelectric device (i.e., disclosed in aforementioned U.S. Pat. No. 5,222,049), or individual receivers such as accelerometers for full duplex communications where data can be transmitted and received by the downhole tools simultaneously. Electronics drivers may be used to control the electric power delivered to the transceiver during data transmission.

It will be appreciated that the downhole control system 22 requires a power source 66 for operation of the system. Power source 66 can be generated in the borehole, at the surface or it can be supplied by energy storage devices such as batteries. Power is used to provide electrical voltage and current to the electronics and electromechanical devices connected to a particular sensor in the borehole. Power for the power source may come from the surface through hardwiring or may be provided in the borehole such as by using a turbine. Other power sources include chemical reactions, flow control, thermal, conventional batteries, borehole electrical potential differential, solids production or hydraulic power methods.

Figure 7:
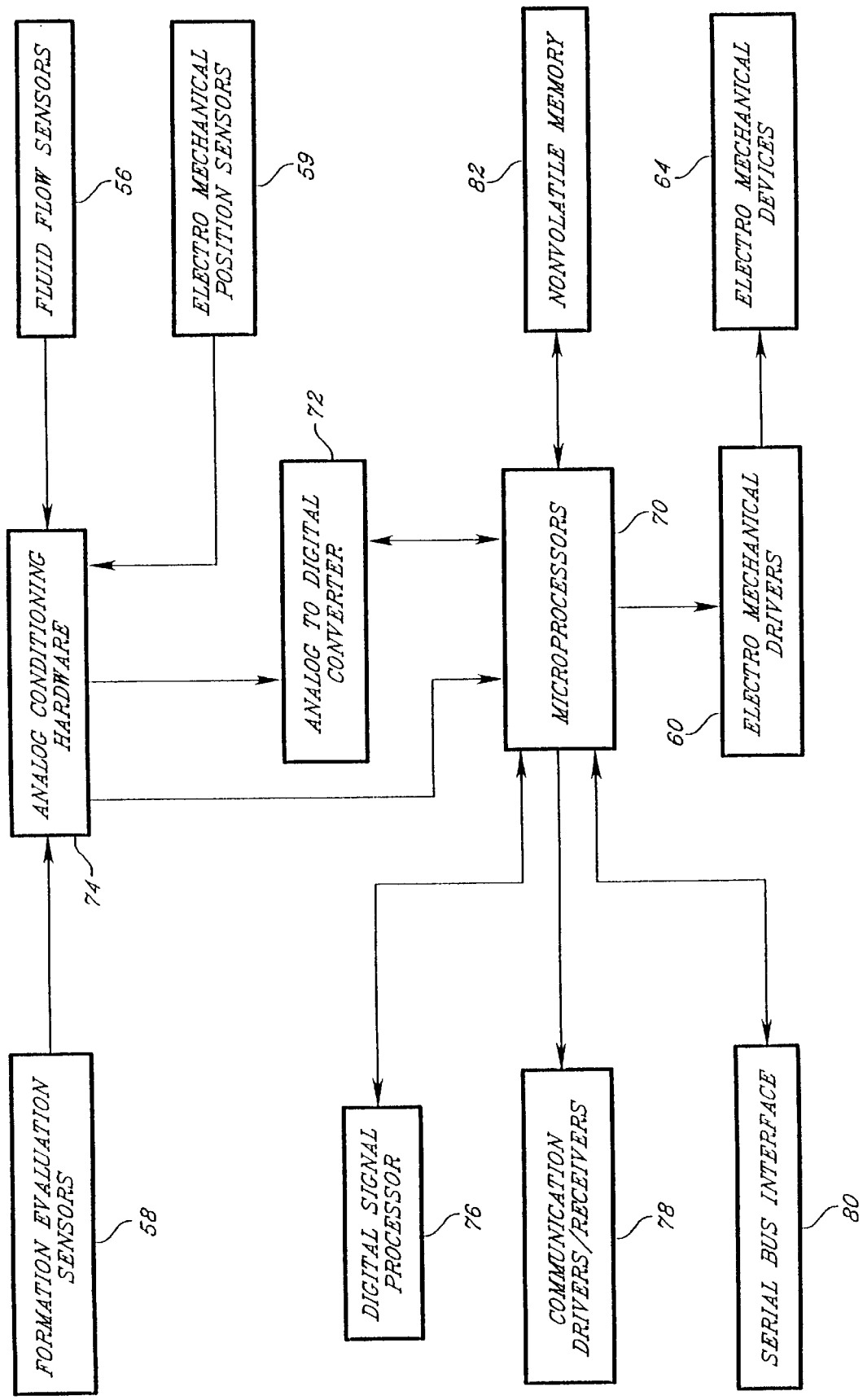
FIG. 7 is an electrical schematic of the downhole production well control system of FIG. 6.

Referring to FIG. 7, an electrical schematic of downhole controller 22 is shown. As discussed in detail above, the downhole electronics system will control the electromechanical systems, monitor formation and flow parameters, process data acquired in the borehole, and transmit and receive commands and data to and from other modules and the surface systems. The electronics controller is composed of a microprocessor 70, an analog to digital converter 72, analog conditioning hardware 74, digital signal processor 76, communications interface 78, serial bus interface 80, non-volatile solid state memory 82 and electromechanical drivers 60.

The microprocessor 70 provides the control and processing capabilities of the system. The processor will control the data acquisition, the data processing, and the evaluation of the data for determination if it is within the proper operating ranges. The controller will also prepare the data for transmission to the surface, and drive the transmitter to send the information to the surface. The processor also has the responsibility of controlling the electromechanical devices 64.

The analog to digital converter 72 transforms the data from the conditioner circuitry into a binary number. That binary number relates to an electrical current or voltage value used to designate a physical parameter acquired from the geological formation, the fluid flow, or status of the electromechanical devices. The analog conditioning hardware processes the signals from the sensors into voltage values that are at the range required by the analog to digital converter.

The digital signal processor 76 provides the capability of exchanging data with the processor to support the evaluation of the acquired downhole information, as well as to encode/decode data for transmitter 52. The processor 70 also provides the control and timing for the drivers 78.

The communication drivers 70 are electronic switches used to control the flow of electrical power to the transmitter. The processor 70 provides the control and timing for the drivers 78.

The serial bus interface 80 allows the processor 70 to interact with the surface data acquisition and control system 42 (see FIGS. 5 and 5C). The serial bus 80 allows the surface system 74 to transfer codes and set parameters to the micro controller 70 to execute its functions downhole.

The electromechanical drivers 60 control the flow of electrical power to the electromechanical devices 64 used for operation of the sliding sleeves, packers, safety valves, plugs and any other fluid control device downhole. The drivers are operated by the microprocessor 70.

The non-volatile memory 82 stores the code commands used by the micro controller 70 to perform its functions downhole. The memory 82 also holds the variables used by the processor 70 to determine if the acquired parameters are in the proper operating range.

It will be appreciated that downhole valves are used for opening and closing of devices used in the control of fluid flow in the wellbore. Such electromechanical downhole valve devices will be actuated by downhole computer 50 either in the event that a borehole sensor value is determined to be outside a safe to operate range set by the operator or if a command is sent from the surface. As has been discussed, it is a particularly significant feature of this invention that the downhole control system 22 permits automatic control of downhole tools and other downhole electronic control apparatus without requiring an initiation or actuation signal from the surface or from some other external source. This is in distinct contrast to prior art control systems wherein control is either actuated from the surface or is actuated by a downhole control device which requires an actuation signal from the surface as discussed above. It will be appreciated that the novel downhole control system of this invention whereby the control of electromechanical devices and/or electronic control apparatus is accomplished automatically without the requirement for a surface or other external actuation signal can be used separately from the remote well production control scheme shown in FIG. 1.

Figure 2:
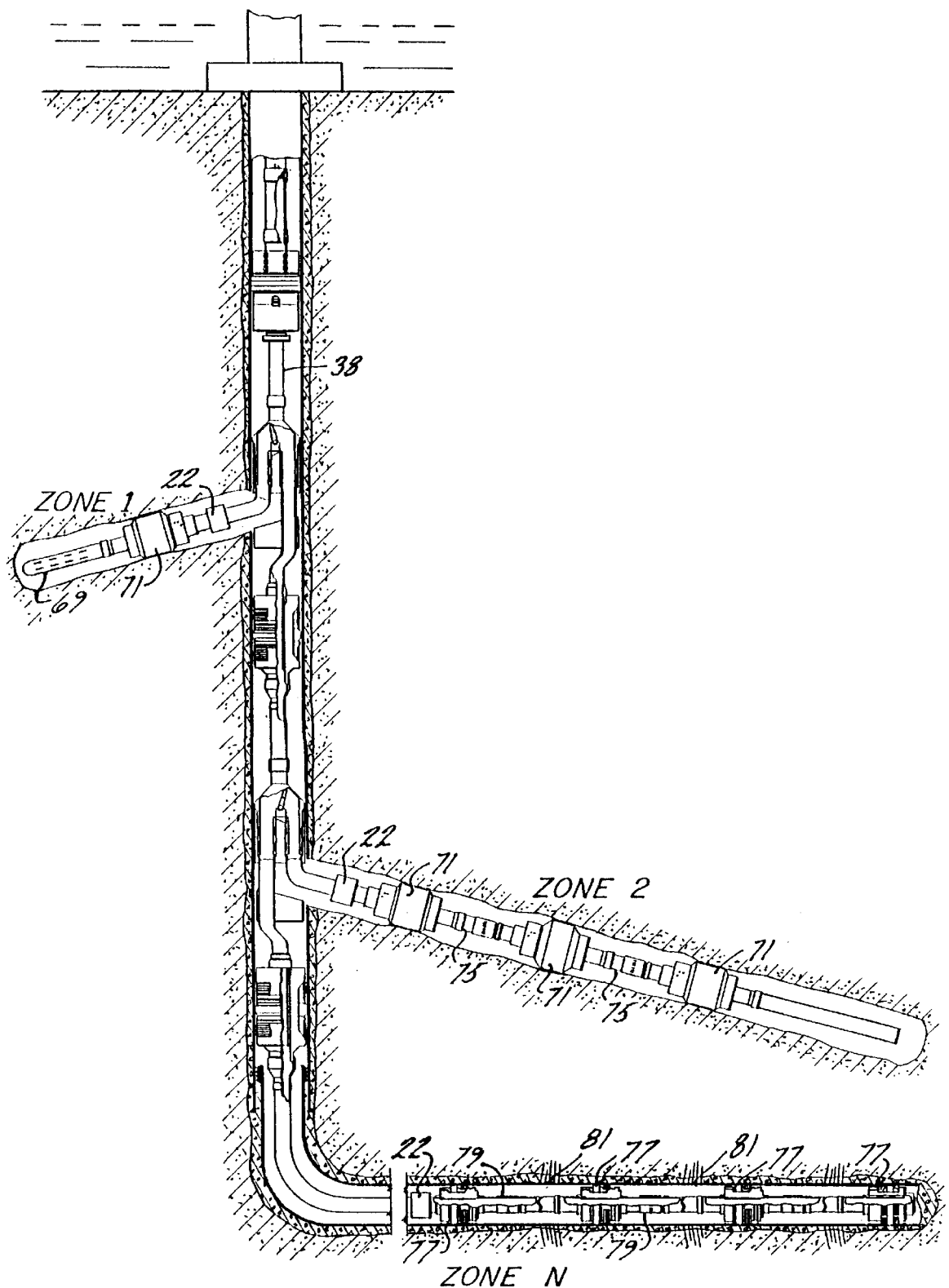
FIG. 2 is an enlarged diagrammatic view of a portion of FIG. 1 depicting a selected well and selected zones in such selected well and a downhole control system for use therewith.
Figure 3:
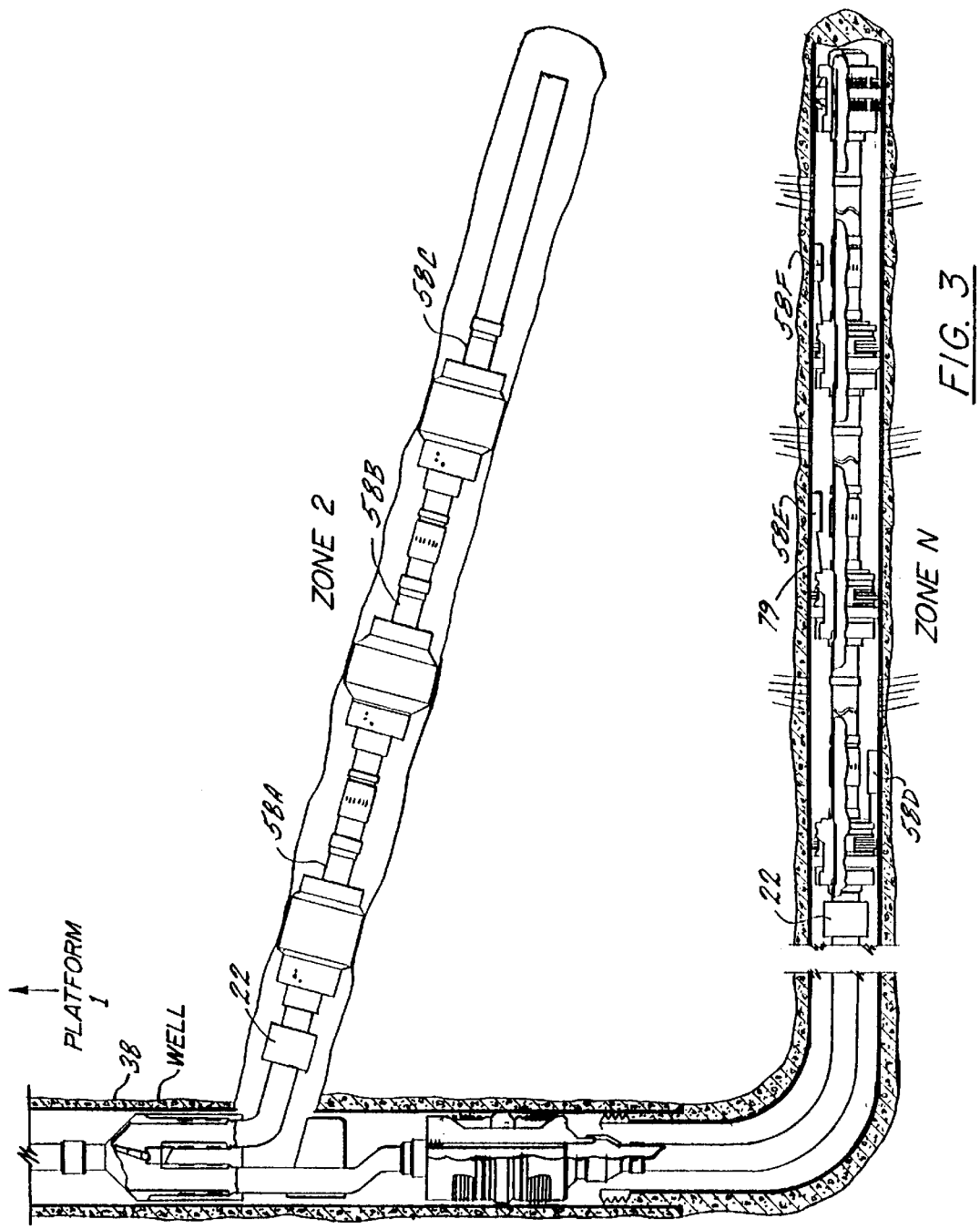
FIG. 3 is an enlarged diagrammatic view of a portion of FIG. 2 depicting control systems for both open hole and cased hole completion zones.
Figure 10:
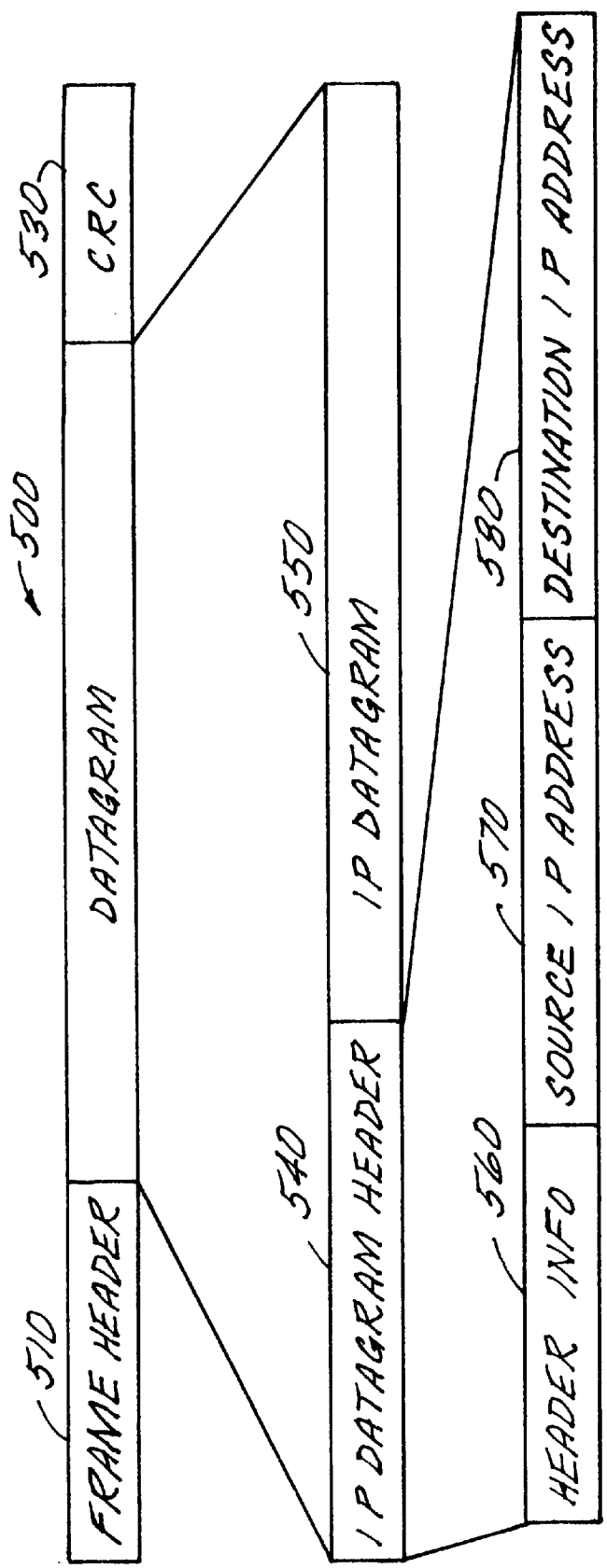
FIG. 10 is a diagrammatic view of the components of an exemplary frame of data.
Figure 11:
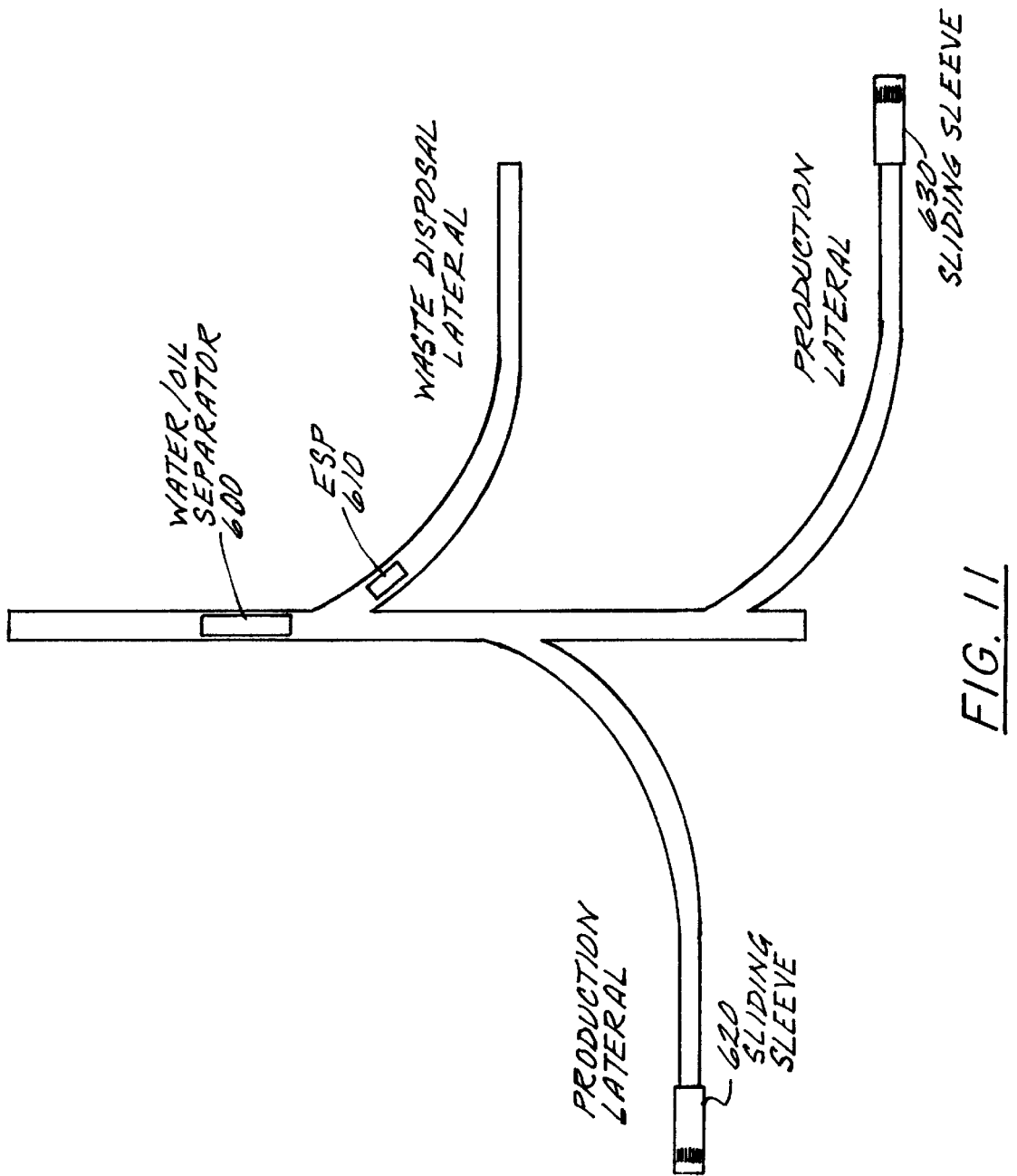
FIG. 11 is a diagrammatic view of a system for separating hydrocarbons from water.

Turning now to FIGS. 2 and 3, an example of the downhole control system 22 is shown in an enlarged view of well number 2 from platform 1 depicting zones 1, 2 and N. Each of zones 1, 2 and N is associated with a downhole control system 22 of the type shown in FIGS. 6 and 7. In zone 1, a slotted liner completion is shown at 69 associated with a packer 71. In zone 2, an open hole completion is shown with a series of packers 73 and intermittent sliding sleeves 75. In zone N, a cased hole completion is shown again with the series of packers 77, sliding sleeve 79 and perforating tools 81. The control system 22 in zone 1 includes electromechanical drivers and electromechanical devices which control the packers 69 and valving associated with the slotted liner so as to control fluid flow. Similarly, control system 22 in zone 2 include electromechanical drivers and electromechanical devices which control the packers, sliding sleeves and valves associated with that open hole completion system. The control system 22 in zone N also includes electromechanical drivers and electromechanical control devices for controlling the packers, sliding sleeves and perforating equipment depicted therein. Any known electromechanical driver 60 or electromechanical control device 64 may be used in connection with this invention to control a downhole tool or valve. Examples of suitable control apparatus are shown, for example, in commonly assigned U.S. Pat. Nos. 5,343,963; 5,199,497; 5,346,014; and 5,188,183, all of the contents of which are incorporated herein by reference; FIGS. 2, 10 and 11 of the '168 patent to Upchurch and FIGS. 10 and 11 of the '160 patent to Upchurch; FIGS. 11–14 of the '112 patent to Schultz; and FIGS. 1–4 of U.S. Pat. No. 3,227,228 to Bannister.

Controllers 22 in each of zones 1, 2 and N have the ability not only to control the electromechanical devices associated with each of the downhole tools, but also have the ability to control other electronic control apparatus which may be associated with, for example, valving for additional fluid control. The downhole control systems 22 in zones 1, 2 and N further have the ability to communicate with each other (for example through hard wiring) so that actions in one zone may be used to effect the actions in another zone. This zone to zone communication constitutes still another important feature of the present invention. In addition, not only can the downhole computers 50 in each of control systems 22 communicate with each other, but the computers 50 also have ability (via transceiver system 52) to communicate through the surface control system 24 and thereby communicate with other surface control systems 24 at other well platforms (i.e., platforms 2 or N), at a remote central control position such as shown at 10 in FIG. 1, or each of the processors 50 in each downhole control system 22 in each zone 1, 2 or N can have the ability to communicate through its transceiver system 52 to other downhole computers 50 in other wells. For example, the downhole computer system 22 in zone 1 of well 2 in platform 1 may communicate with a downhole control system on platform 2 located in one of the zones or one of the wells associated therewith. Thus, the downhole control system of the present invention permits communication between computers in different wellbores, communication between computers in different zones and communication between computers from one specific zone to a central remote location.

Information sent from the surface to transceiver 52 may consist of actual control information, or may consist of data which is used to reprogram the memory in processor 50 for initiating of automatic control based on sensor information. In addition to reprogramming information, the information sent from the surface may also be used to recalibrate a particular sensor. Processor 50 in turn may not only send raw data and status information to the surface through transceiver 52, but may also process data downhole using appropriate algorithms and other methods so that the information sent to the surface constitutes derived data in a form well suited for analysis.

Referring to FIG. 3, an enlarged view of zones 2 and N from well 2 of platform 1 is shown. As discussed, a plurality of downhole flow sensors 56 and downhole formation evaluation sensors 58 communicate with downhole controller 22. The sensors are permanently located downhole and are positioned in the completion string and/or in the borehole casing. In accordance with still another important feature of this invention, formation evaluation sensors may be incorporated in the completion string such as shown at 58A–C in zone 2; or may be positioned adjacent the borehole casing 78 such as shown at 58D–F in zone N. In the latter case, the formation evaluation sensors are hardwired back to control system 22. The formation evaluation sensors may be of the type described above including density, porosity and resistivity types. These sensors measure formation geology, formation saturation, formation porosity, gas influx, water content, petroleum content and formation chemical elements such as potassium, uranium and thorium. Examples of suitable sensors are described in commonly assigned U.S. Pat. Nos. 5,278,758 (porosity), 5,134,285 (density) and 5,001,675 (electromagnetic resistivity), all of the contents of each patent being incorporated herein by reference.

Figure 8:
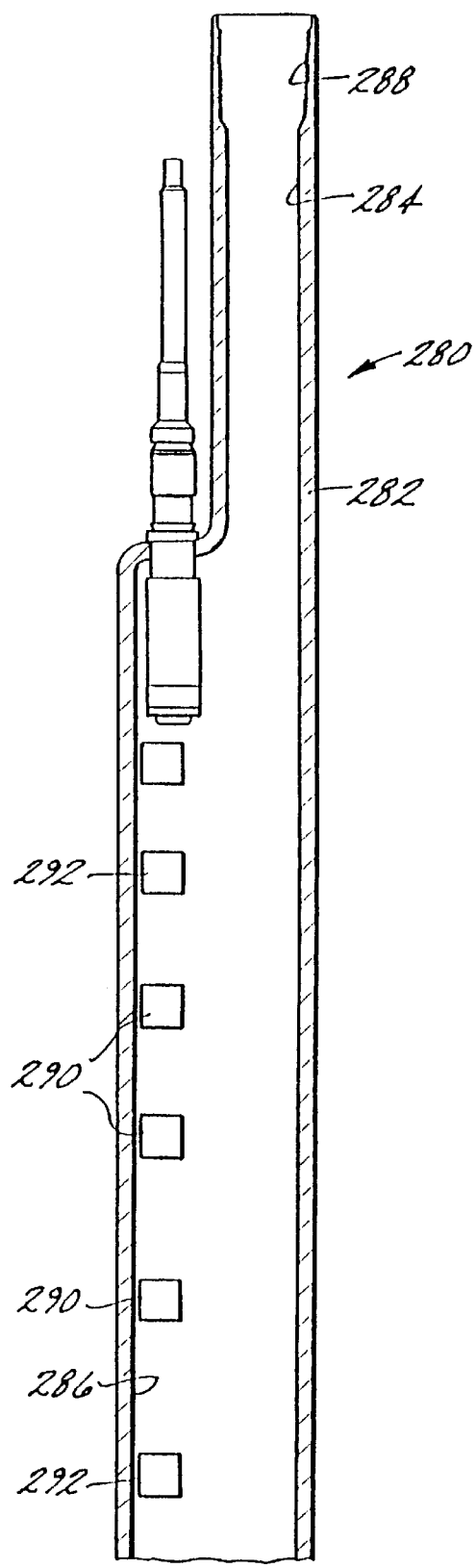
FIG. 8 is a cross-sectional side elevation view of a downhole formation evaluation sensor in accordance with the present invention.

Referring to FIG. 8, an example of a downhole formation evaluation sensor for permanent placement in a production well is shown at 280. This sensor 280 is comprised of a side pocket mandrel 282 which includes a primary longitudinal bore 284 and a laterally displaced side pocket 286. Mandrel 282 includes threading 288 at both ends for attachment to production tubing. Positioned sequentially in spaced relation longitudinally along side pocket 286 are a plurality (in this case 3) of acoustic, electromagnetic or nuclear receivers 290 which are sandwiched between a pair of respective acoustic, electromagnetic or nuclear transmitters 292. Transmitters 292 and receivers 290 all communicate with appropriate and known electronics for carrying out formation evaluation measurements.

The information regarding the formation which is obtained by transmitters 292 and receivers 286 will be forwarded to a downhole module 22 and transmitted to the surface using any of the aforementioned hardwired or wireless communications techniques. In the embodiment shown in FIG. 8, the formation evaluation information is transmitted to the surface on inductive coupler 294 and tubular encased conductor (TEC) 296, both of which will be described in detail hereinafter.

As mentioned above, in the prior art, formation evaluation in production wells was accomplished using expensive and time consuming wire line devices which was positioned through the production tubing. The only sensors permanently positioned in a production well were those used to measure temperature, pressure and fluid flow. In contrast, the present invention permanently locates formation evaluation sensors downhole in the production well. The permanently positioned formation evaluation sensors of the present invention will monitor both fluid flow and, more importantly, will measure formation parameters so that changing conditions in the formation will be sensed before problems occur. For example, water in the formation can be measured prior to such water reaching the borehole and therefore water will be prevented from being produced in the borehole. At present, water is sensed only after it enters the production tubing.

The formation evaluation sensors of this invention are located closer to the formation as compared to wireline sensors in the production tubing and will therefore provide more accurate results. Since the formation evaluation data will constantly be available in real or near real time, there will be no need to periodically shut in the well and perform costly wireline evaluations.

The multiwell/multizone production well control system of the present invention may be operated as follows:

1. Place the downhole systems 22 in the tubing string 38.

2. Use the surface computer system 24 to test the downhole modules 22 going into the borehole to assure that they are working properly.

3. Program the modules 22 for the proper downhole parameters to be monitored.

4. Install and interface the surface sensors 46 to the computer controlled system 24.

5. Place the downhole modules 22 in the borehole, and assure that they reach the proper zones to be monitored and/or controlled by gathering the formation natural gamma rays in the borehole, and comparing the data to existing MWD or wireline logs, and monitoring the information provided by the depth measurement module 44.

6. Collect data at fixed intervals after all downhole modules 22 have been installed by polling each of the downhole systems 22 in the borehole using the surface computer based system 24.

7. If the electromechanical devices 64 need to be actuated to control the formation and/or well flow, the operator may send a command to the downhole electronics module 50 instructing it to actuate the electromechanical device. A message will be sent to the surface from the electronics control module 50 indicating that the command was executed. Alternatively, the downhole electronics module may automatically actuate the electromechanical device without an external command from the surface.

8. The operator can inquire the status of wells from a remote location 10 by establishing a phone or satellite link to the desired location. The remote surface computer 24 will ask the operator for a password for proper access to the remote system.

9. A message will be sent from the downhole module 22 in the well to the surface system 24 indicating that an electromechanical device 64 was actuated by the downhole electronics 50 if a flow or borehole parameter changed outside the normal operating range. The operator will have the option to question the downhole module as to why the action was taken in the borehole and overwrite the action by commanding the downhole module to go back to the original status. The operator may optionally send to the module a new set of parameters that will reflect the new operating ranges.

10. During an emergency situation or loss of power all devices will revert to a known fail safe mode.

The production well control system of this invention may utilize a wide variety of conventional as well as novel downhole tools, sensors, valving and the like. Examples of certain preferred and novel downhole tools for use in the system of the present invention are disclosed in U.S. patent application Ser. No. 08/385,992, filed Feb. 9, 1995 entitled "Downhole Production Well Control System and Method" which is incorporated herein by reference.

As the demands on downhole monitoring and control increase, it is necessary that the downhole control systems 22 be capable of interfacing directly with each other to transfer status information, as well as operations to be performed of that have already been performed. Communications between the various downhole control systems (or nodes) may be accomplished by modulating signals along with DC power required by each component. These downhole control systems 22 will communicate using digital networks that will allow the data and commands to be transferred from one downhole control system to another.

Figure 9:
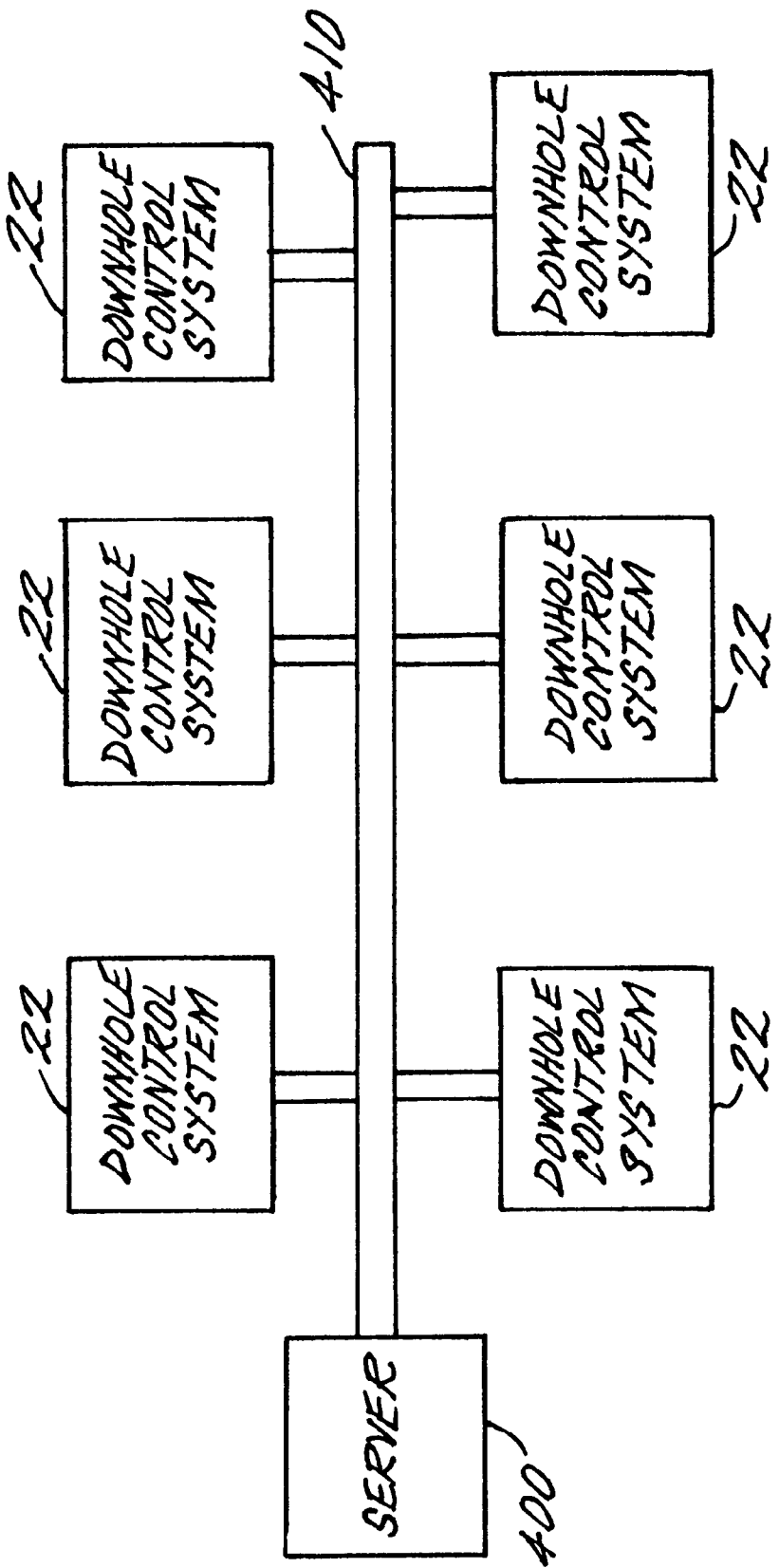
FIG. 9 is a block diagram of a network of downhole control systems.

FIG. 9 is a block diagram of an exemplary downhole network. Each downhole control system 22 is connected to a network 410. As shown in FIG. 6, each downhole control system 22 is connected to a variety of sensors and control devices. The network 410 is implemented using cable or wireless communications. Each downhole control system 22 includes the appropriate communications circuitry (e.g. Ethernet card) for communicating on the network 410. A bus master or server 400 monitors network traffic and performs supervisory tasks as described herein. The surface control system 24 is coupled to the network through the bus master 400.

In general, the bus master 400 must be capable of overseeing the followings tasks.

1. Node to node (downhole control system to downhole control system) communications not involving the bus master.

2. Task override functions to prevent incorrect tasks to be performed by the downhole control systems, or to determine when a device downhole has failed.

3. Network arbitration when collisions occur.

4. Provide the structure and priority for the performance of downhole tasks by an individual downhole control system.

The bus master 400 will arbitrate between the various downhole control systems while monitoring their responses. All network issues, such as data collision, locking out a malfunctioning node, as well as control, are also the responsibility of the bus master 400. Periodically, as determined by the surface system 24, the bus master 400 will report to and accept direction from the surface equipment.

All networks require three basic components: 1) hardware, 2) software, and 3) communications channels. Hardware refers to the electronic components or systems in each node. In the present invention, each downhole control system 22 includes a microprocessor 70 for controlling each downhole control system. Software refers to the program that controls the hardware and interprets the incoming and prepares the outgoing data. A non-volatile memory 82 contains software for sending and receiving communications along the network. Communications channels refers to the physical interconnecting component (i.e., co-axial cable, twisted pairs, fiber optics, radio link, acoustic link, or electro-magnetic link) shown as network 410. As previously described, each downhole control system includes communications circuitry (e.g. Ethernet card) for communicating on the network 410.

The speed of a network is dependent on many factors (e.g. cable length and hardware speed). However, the actual efficiency of a network also depends on how many nodes are present and on how often they transmit. In a polled type of system, there is traffic only when the master requests a response from a slave. With a peer-to-peer communication system, the data is transferred directly from one node to another without passing through a bus master or server first. This approach greatly enhances the efficiency of a network and is important to a semi-autonomous system.

Preferably, devices present on the same network will be polled devices; that is, will respond only when addressed by the bus master. If any of the devices need to report something without being polled they will check the network for the absence of traffic prior to forwarding its data to the bus master. In the event of data collision, all devices will be silent and the bus master will poll each device in turn to determine which device has important information. Such information might be to report a catastrophic failure within the device or to report a condition that is outside normal parameters.

Each node extracts power and data from the network. The node regulates the network power to the necessary level suitable for the device. Each node also extracts the data from the network and delivers it to the communications area of the device for processing. Each node determines if the data on the network is a command for it. If it is not a command directed to the device, it will do nothing.

Various parameters are stored, as necessary, for each device to operate on its own. An example situation is an instruction to move a sliding sleeve valve from fill open to half open. After accepting the command and responding to the bus master 400, the downhole control system 22 will attend to the task of moving the sleeve to the half way point. All control for the device is maintained locally and the sleeve sensor determines when the sliding sleeve has reached the half way point. Upon completion of the task, the downhole control system 22 checks for a clear network and reports to the bus master 400 the task is complete. Each re-task is dealt with the same way.

The bus master 400 can function in three or more modes. First, the bus master 400 polls the various nodes for a response. No other functionality exists without the bus master. Second, the bus master 400 watches the network traffic and intercedes when necessary as determined by parameters provided by the surface system 24. Lastly, each node takes over the network 410 while peer-to-peer communication occurs. Peer-to-peer is the same as node-to-node without passing through the bus master 400. An example of node-to-node communication is a sliding sleeve in one well communicating directly to another sliding sleeve in another lateral. A node, when it needs to communicate to another, will wait for a silent network to address the other node. The only time the bus master 400 interacts is when, based on parameters supplied from the surface, it feels the necessity.

When a network collision occurs (two or more devices attempting to transmit data at the same time), the collision detection circuitry causes all nodes to go silent. Each has a timer which, at the time the collision is detected, will reset. Each time is programmed with a different delay and will wait that length of time before attempting to communicate again. The result of this is to ensure two or more devices don't repeatedly attempt to talk over each other. The staggered delays ensure that no two nodes transmit during the other's transmission.

The network used to communicate among the modules located at the surface and downhole will use single or multiple conductors including copper and fiber optics or wireless communications to transfer analog and digital information. Each downhole control system (node) will have an individual and unique address that will be used for accessing that node. The communications can be achieved by asynchronous or synchronous systems. The synchronous systems use embedded clocks to determine the timing for each bit, while asynchronous communications use start and stop bits to provide the synchronization between the devices that are attempting to setup communications link.

The network may use simple asynchronous communications technique with the following format:

Bit #1—Start bit;
Bit #2 through 9—data or address;
Bit #10—Parity which provides error detection capabilities;
Bit #11—Stop bit.

Synchronous communications techniques include Manchester codes which provides address information and blocks of data transfer capability instead of the single word transfer capability of the asynchronous technique.

Communications on the network 410 must be made pursuant to a network protocol. Protocols are many and vary in complexity. Some examples are ATM, TCP/IP, Token Ring and Ethernet. A protocol is an established rule on what the data frame is comprised of FIG. 10 is a diagrammatic view of an exemplary data frame 500 used to communicate on the network 410. It is understood that different communication protocols may require different data frame elements and/or different arrangements of the elements. The data frame 500 includes a frame header 510, a datagram 520 and CRC 530. The body of the frame 500 may vary depending on what type of datagram is in use, such as UDP datagram or IP datagram. The end of the frame 500 is a CRC code 530 used for error correction. Within each frame 500 is a datagram 520. The IP datagram, for example, consists of an IP datagram header 540 and IP datagram data 550. In an open system, more than one type of datagram is transported over the same communications channel. The IP datagram header 540 is further broken down into other information, such as header information 560, source IP address 570 and destination IP address 580, required by the protocol so that each node knows the origin and destination of each data frame.

FIG. 11 is a diagrammatic view of an exemplary application of the downhole network described above. FIG. 11 is a system for separating water from the hydrocarbons being produced, and disposing of the water in laterals created from the main bore. A network is used to control the separation of hydrocarbons from water. The use of oil/water separators within the downhole factory will reduce the cost of processing waste water at the surface.

The water/oil separator 600 of FIG. 11 is a semi-autonomous control system designed to mediate the flow of borehole fluids based on parameters supplied by the surface while overseeing the separation of oil and water in the flow path. The water/oil separator module 600 acts as a bus master in arbitrating between the various other components while maintaining optimum oil purity. Further, it operates, as needed, an electric submersible pump (ESP) 610 to dispose the separated water in an adjacent lateral designated for that purpose. The downhole network consists of an interconnecting cable that supplies surface power and facilitates communication, one or more sliding sleeve assemblies 620 and 630, a water/oil separator 600, and an ESP 610. The sliding sleeve assemblies 620 and 630, the water/oil separator 600, and the ESP 610 are connected by a network. The sliding sleeve assemblies 620 and 630 and the ESP 610 include the control circuitry, sensors and drivers, as described above, needed to establish communication on the network and control the sliding sleeve valve.

In a preferred embodiment, the water/oil separator's bus master will gage the amount of water that escapes the separation process and compare it against the amount of opening area in each of the upstream sliding sleeves 620 and 630. Based on this information, the water/oil separator 600 will vary the opening of each sleeve sequentially in order to determine the source of the water. The water/oil separator 600 may also modulate the flow area of all of the sleeves in order to reduce the overall flow rate to effect the same goal.

The downhole network allows individual downhole control systems to communicate to each other in order to optimize well production. The network is not limited to multiple zones in a single well, but may extend across a plurality of wells. The bus master monitors communications over the network and performs a variety of supervisory functions. The network allows information concerning different areas of the well to be available to all downhole control systems and the bus master thereby leading to more informed control decisions and higher well efficiency.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A downhole network for monitoring and controlling downhole conditions, said network comprising:
   a plurality of downhole control systems; and
   a network connected to each of said downhole control systems for providing communications between a first downhole control system and a second downhole control system.

2. The downhole network of claim 1 further comprising a server connected to said network for monitoring and controlling network communications.

3. The downhole network of claim 2 wherein said server polls said downhole control systems for responses.

4. The downhole network of claim 2 wherein when said server detects a data collision on said network said server transmits a command to each downhole control system instructing each downhole control system to cease communications.

5. The downhole network of claim 4 wherein upon receiving the command to cease communications, each downhole control system delays a predetermined time period prior to attempting communications.

6. The downhole network of claim 5 wherein each downhole control systems delays for a different predetermined time period.

7. The downhole network of claim 1 wherein said downhole control systems include a microprocessor.

8. The downhole network of claim 1 wherein said downhole control systems include communication devices for communicating over said network.

9. The downhole network of claim 1 wherein said first downhole control system communicates directly with said second downhole control system.

10. A production well control system comprising:
    a surface computer system; and
    a downhole network for monitoring and controlling downhole conditions, said network comprising:
       a plurality of downhole control systems;
       a network connected to each of said downhole control systems for providing communications between a first downhole control system and a second downhole control system; and
       a server connected to said network for monitoring and controlling network communications;
    wherein said surface computer system communicates with said server.

* * * * *